(12) United States Patent
Bloom et al.

(10) Patent No.: US 10,915,860 B2
(45) Date of Patent: Feb. 9, 2021

(54) FOOD AND BEVERAGE ITEM IDENTIFICATION AND TRACKING DEVICE AND SYSTEM FOR IMPROVING SUPPLY CHAIN LOGISTICAL OPERATIONS AND INVENTORY MANAGEMENT

(71) Applicant: Bitcork Inc., Eugene, OR (US)

(72) Inventors: Justin D. Bloom, Eugene, OR (US);
Todd S. Edman, Eugene, OR (US);
Jesse N. Ralston, Eugene, OR (US)

(73) Assignee: Bitcork Inc., Eugene, OR (US)

( * ) Notice: Subject to any disclaimer, the term of this patent is extended or adjusted under 35 U.S.C. 154(b) by 0 days.

(21) Appl. No.: 16/565,391

(22) Filed: Sep. 9, 2019

(65) Prior Publication Data

US 2020/0097894 A1    Mar. 26, 2020

Related U.S. Application Data

(60) Provisional application No. 62/734,060, filed on Sep. 20, 2018.

(51) Int. Cl.
*G06Q 10/08*   (2012.01)
*G06Q 30/06*   (2012.01)
(Continued)

(52) U.S. Cl.
CPC ....... *G06Q 10/087* (2013.01); *G06Q 10/0832* (2013.01); *G06Q 30/0631* (2013.01); *G08B 5/38* (2013.01); *G06Q 50/12* (2013.01)

(58) Field of Classification Search
CPC ............. G06Q 10/087; G06Q 10/0832; G06Q 30/0631
(Continued)

(56) References Cited

U.S. PATENT DOCUMENTS 7,828,211 B2 * 11/2010 Landers, Jr. ......... G06Q 10/087
                                              235/385
8,590,751 B2    11/2013 Ciavarella et al.
(Continued)

OTHER PUBLICATIONS

PCT/US2019/050493, International Search Report & Written Opinion.

(Continued)

*Primary Examiner* — John A Tweel, Jr.
(74) *Attorney, Agent, or Firm* — Renaissance IP Law Group, LLP; David A. Crowther

(57) ABSTRACT

A food and beverage item identification and tracking device, and system for improving supply chain logistical operations and inventory management are disclosed. Multiple food and beverage item identification and tracking devices may be attached to corresponding beverage containers or food containers. Each of the food and beverage item identification and tracking devices includes a wireless communication device and a user interface. The user interface includes an LED to emit light responsive to an instruction received wirelessly, so that the food or beverage container is visually identifiable. The user interface may also include a speaker or buzzer so that the food or beverage container is audibly identifiable. A remote computing device may control the food and beverage item identification and tracking devices so that a subset of the tracking devices can be identified, and packaged for shipment. The system is designed to operate within either a distributor location or a reseller location.

19 Claims, 12 Drawing Sheets

(51) Int. Cl.
*G08B 5/38* (2006.01)
*G06Q 50/12* (2012.01)

(58) Field of Classification Search
USPC .................................................... 340/539.17
See application file for complete search history.

(56) References Cited

U.S. PATENT DOCUMENTS

| | | | |
|---|---|---|---|
| 8,717,182 B1* | 5/2014 | Brashears | G06K 7/10722 |
| | | | 340/603 |
| 8,950,671 B2* | 2/2015 | Chan | G06Q 10/0875 |
| | | | 235/385 |
| 9,162,799 B2 | 10/2015 | Perry et al. | |
| D761,138 S | 7/2016 | Manabe et al. | |
| D775,978 S | 1/2017 | Christianson et al. | |
| D775,979 S | 1/2017 | Christianson et al. | |
| 9,557,307 B2* | 1/2017 | Greene | G01N 33/146 |
| D778,750 S | 2/2017 | Phillips et al. | |
| D798,757 S | 10/2017 | Corley et al. | |
| D838,203 S | 1/2019 | Corley et al. | |
| D843,862 S | 3/2019 | Bellows et al. | |
| 2016/0137483 A1 | 5/2016 | Pfeiffer et al. | |
| 2016/0247118 A1 | 8/2016 | Singh | |
| 2016/0267430 A1 | 9/2016 | Smith | |
| 2019/0065924 A1* | 2/2019 | Nooner | G06K 19/07758 |

OTHER PUBLICATIONS

Puri. Cheers! Choose the right wine with Sommely IoT smart caps. 2016.

* cited by examiner

US 10,915,860 B2

FOOD AND BEVERAGE ITEM IDENTIFICATION AND TRACKING DEVICE AND SYSTEM FOR IMPROVING SUPPLY CHAIN LOGISTICAL OPERATIONS AND INVENTORY MANAGEMENT

RELATED APPLICATION DATA

This application claims the benefit of U.S. Provisional Patent Application Ser. No. 62/734,060, filed on Sep. 20, 2018, which is hereby incorporated by reference.

TECHNICAL FIELD

This application pertains to a food and beverage item identification and tracking device, and more particularly, to a system for improving supply chain logistical operations such as pick and pack operations, and inventory management in the wholesale and retail food and beverage industry.

BACKGROUND

Management of supply chain logistical operations and inventory tracking is both time consuming and labor intensive. From the wholesaler and/or distributor all the way down to a reseller and/or retail location, numerous manual identifications of items occur, most of which are conducted by humans. Such manual identifications and tracking of items by humans is highly error-prone.

For example, when items are being grouped together and packaged at a wholesaler and/or distributor location, wrong items might be grouped and packaged together. To compound the errors, at the reseller location, wrong items might again be picked, thereby causing the end buyer to receive items that they did not order or desire to have. Sometimes, the end buyer receives items of a lesser quality than they should have received based on the purchase price.

By way of another example, inventories within a restaurant, grocery store, retail outlet, or other reseller (hereinafter "reseller") of beverages are notoriously difficult to manage. The process of counting inventory of beverages containers, such as bottles of wines or kegs of beer, is conventionally a manual process that is typically performed at least weekly. This inventory information is used when placing orders for additional beverage stock with a wholesaler, distributor, or supplier (hereinafter "distributor"). Because the process of managing inventory, orders, and managing distributors is labor intensive for resellers, it is common for orders to be placed infrequently.

Labor costs are rising and are at historically high levels, and so the management of inventory and orders is costly. Some restaurants, for example, have reacted by reducing the number of distributors they work with as well as placing larger orders of a smaller set of alcoholic beverages. Though this addresses the difficulties posed by rising labor costs, it also reduces the selection of alcoholic beverages available to the customer and most acutely impacts the availability of wines and other alcoholic beverages distributed or supplied from smaller wineries and breweries. Restaurant sales of wines produced by small wineries have dropped by about 60% in the last five years.

Accordingly, a need remains for improved devices and systems that improve food and beverage item identification, smooth out logistical operations, and enable management of inventory and item orders from distributors in a more efficient manner. Embodiments of the inventive concept address these and other limitations in the prior art.

Figure 1:
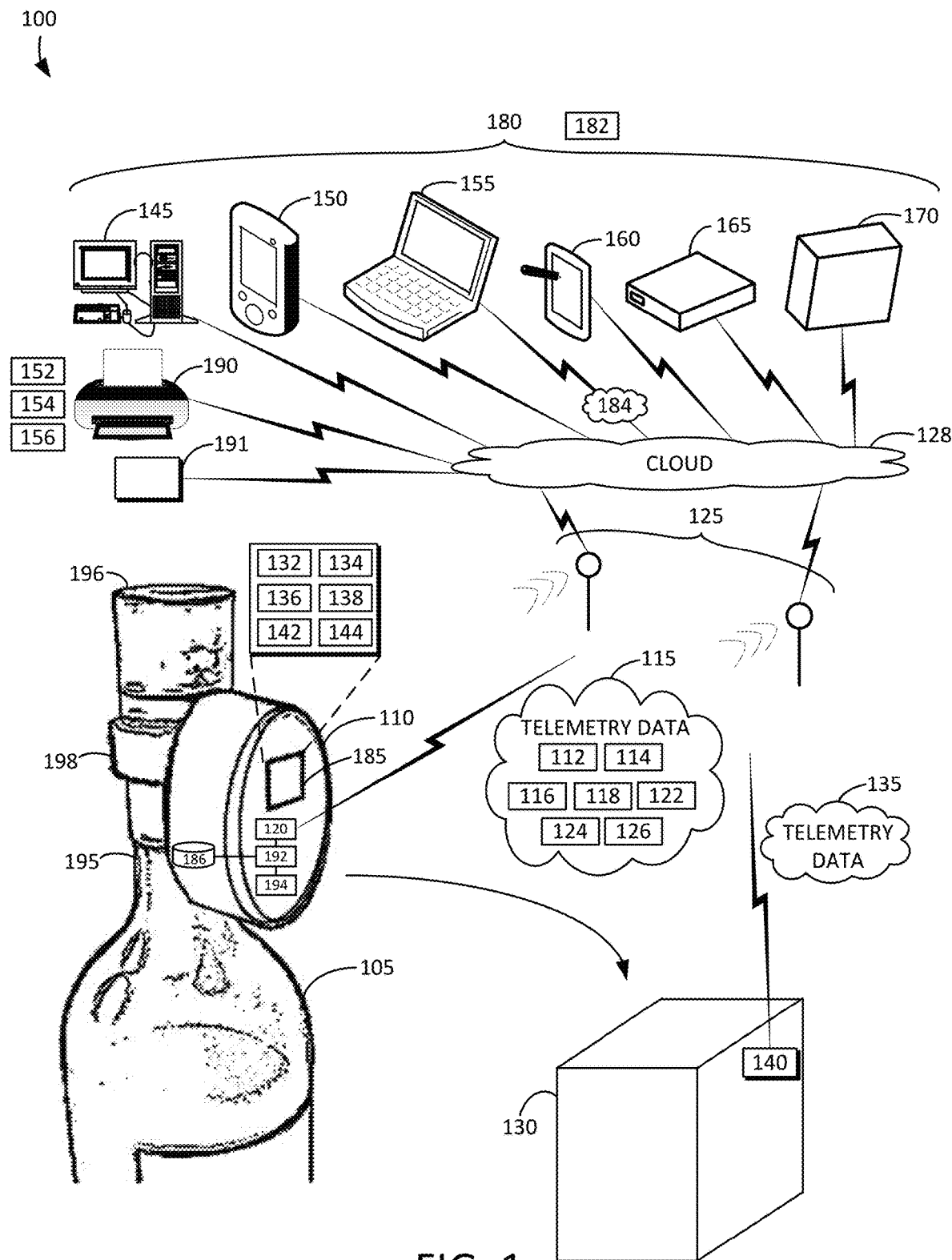
FIG. 1 illustrates a block diagram of an example beverage container management system including a beverage container and a beverage asset tracking and monitoring device attached thereto in accordance with various embodiments of the present inventive concept.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first monitoring device could be termed a second monitoring, and, similarly, a second monitoring device could be termed a first monitoring device, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present inventive concept solve significant inventory challenges experienced by restaurants, grocery stores, and other resellers such as a hotel, lounge, bar, nightclub, wine tasting room, or the like. Although non-alcoholic beverages would benefit from the inventive concept described herein, alcoholic beverages such as wine, beer, and cider are of higher value to resellers, and thus demand better monitoring solutions. Moreover, the embodiments described herein provide improvements in supply chain logistical operations and inventory management of food items, as explained in detail below.

The system described herein provides real-time inventory counting and management and automates the process of reordering alcoholic beverages and food. Alcoholic beverages such as beer, cider, wine, and liquor are generally sold by the bottle or by the keg. It will be understood that a reference to a "beverage container," "bottle," "keg," or the like are all applicable when describing the inventive system. In other words, the devices and systems described herein can be used with a bottle, a keg, or the like. With respect to food, the devices and systems described herein can be used with a food container, a package, a box, a case, a pallet, or the like.

Additionally, it will be understood that other resellers of alcoholic beverages, such as a hotel, lounge, bar, nightclub, wine tasting room, or the like can also benefit from the inventive system described herein. A restaurant selling wine, beer, cider, or the like by the bottle, and beer and other beverages on tap, must frequently count their remaining inventory and place orders with various distributors and suppliers. Failing to manage inventory causes a number of problems, including inaccurate wine lists, menus, customer complaints, and lost sales when a customer orders a beverage where inventory is no longer available.

Figure 2:
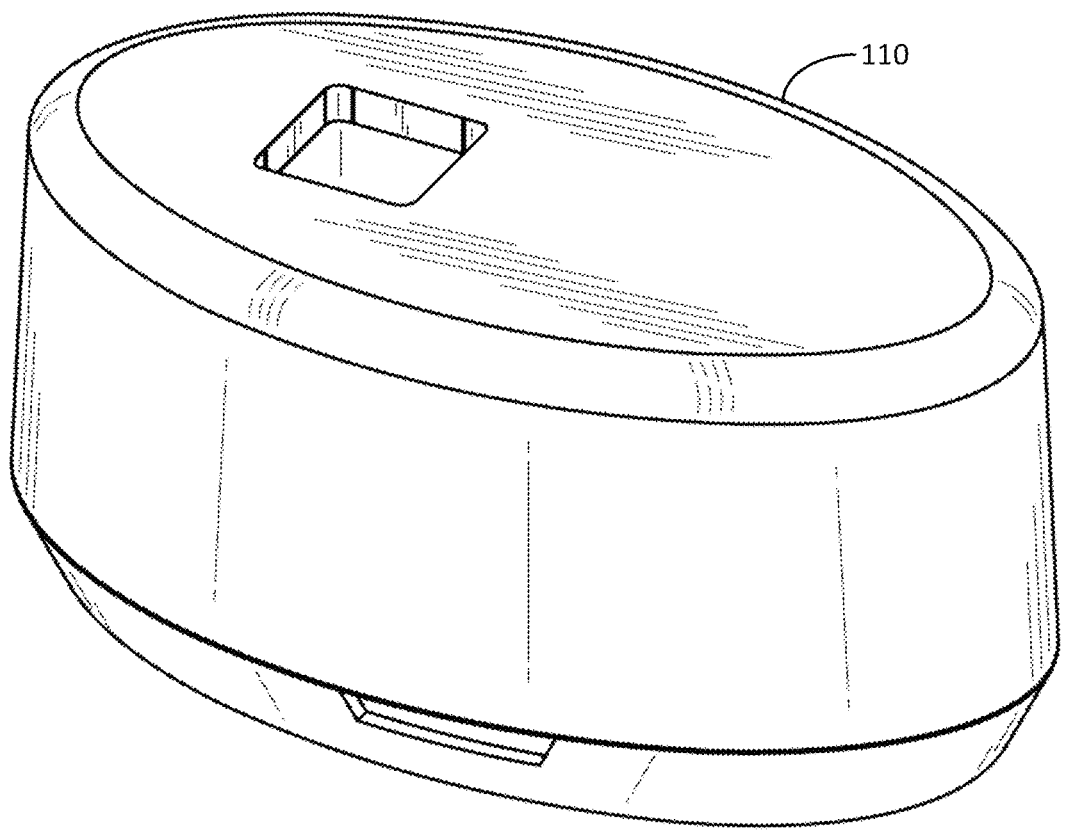
FIG. 2 illustrates a perspective view of the beverage asset tracking and monitoring device of FIG. 1.

FIG. 1 illustrates a block diagram of an example beverage container management system 100 including a beverage container 105 and beverage asset tracking and monitoring device 110 attached thereto in accordance with various embodiments of the present inventive concept. FIG. 2 illustrates a perspective view of the beverage asset tracking and monitoring device 110 of FIG. 1. Reference is now made to FIGS. 1 and 2.

The beverage container 105 can be a bottle or keg, for example. The beverage container 105 may include a cork 196 or other suitable lid. The beverage asset tracking and monitoring device 110 can be attached to the beverage container 105. For example, the beverage asset tracking and monitoring device 110 can be attached to a neck 195 of the beverage container 105. For example, the beverage asset tracking and monitoring device 110 can be attached to the neck 195 of the beverage container 105 using a band 198. The beverage asset tracking and monitoring device 110 can be removed from the beverage container 105. For example, the beverage asset tracking and monitoring device 110 can be removed from the beverage container 105 by lifting the band 198 off of the neck 195 of the beverage container 105. The band 198 may be made of plastic, rubber, metal, a composite material, or the like. The beverage asset tracking and monitoring device 110 can include an outer housing that is made of a hard material such as plastic, metal, a composite material, or the like. The outer housing of the beverage asset tracking and monitoring device 110 can contain various electronic components as further described below.

The beverage asset tracking and monitoring device 110 can transmit telemetry data 115 using an embedded wireless communication device 120. The embedded wireless communication device 120 can be a transmitter, a receiver, and/or a transceiver. For the sake of brevity in description, the embedded wireless communication device 120 is generally referred to herein as a transceiver. The beverage asset tracking and monitoring device 110 can further include a microprocessor 192, local control logic 194, and/or a local storage device 186. The local storage device 186 can include volatile memory such as a dynamic random access memory (DRAM) and/or non-volatile memory such as flash memory or a solid state drive (SSD). The local storage device 186 can store identification and tracking information discussed below, and can provide the identification and tracking information to the wireless communication device 120, which can then be transmitted to an external computing device (e.g., 180), for example, by way of an intermediate transceiver (e.g., 125).

The telemetry data 115 can include, for example, motion data 112 that correlates to motion of the beverage container 105. The telemetry data 115 can include location data 114 using global positioning system (GPS) technology that correlates to a location of the beverage container 105, dead reaconing technology that correlates to a location of the beverage container 105, inertial navigation technology that correlates to a location of the beverage container 105, and/or other suitable location-detection technologies. The telemetry data 115 can include tilt angle of the beverage container 105. The telemetry data 115 can include proximity data 116 that includes information regarding proximity of the beverage container 105 to a known location, temperature data 118 that correlates to the temperature of the beverage container 105 and/or to ambient temperature, light intensity 122 data that correlates to the intensity of light in an area in which the beverage container 105 is located, vibration data 124 that correlates to an amount of vibration of the beverage container 105, marketing or other product-specific data 126, or the like.

The management system 100 may include one or more external transceivers 125 capable of receiving the telemetry data 115. The one or more external transceivers 125 are external relative to the beverage asset tracking and monitoring device 110. When determining location of the beverage container 105 without access to GPS data, the location of one or more external transceivers 125 allows the proximity of the transmitting device 110 to be determined, and therefore, the proximity of the beverage container 105 can also be determined. The one or more external transceivers 125 may include a WiFi transceiver, a cellular transceiver, or other suitable RF transceiver.

The motion telemetry data 112 also provides the ability to determine whether or not the beverage asset tracking and monitoring device 110 has been removed from the beverage container 105. In some embodiments, after removal of the beverage asset tracking and monitoring device 110 from the beverage container 105, the beverage asset tracking and monitoring device 110 can be placed into a designated receptacle 130. The receptacle 130 can include a wireless communication device 140. The wireless communication device 140 can be a transmitter, a receiver, and/or a transceiver. For the sake of brevity in description, the wireless communication device 140 is generally referred to herein as a transceiver.

The transceiver 140 of the receptacle 130 can transmit telemetry data 135 to the one or more external transceivers 125. The telemetry data 135 can be similar to or the same as the telemetry data 115 described above. In some embodiments, the transceiver 140 automatically transmits the telemetry data 135 upon insertion of the beverage asset tracking and monitoring device 110 into the receptacle 130. The telemetry data (e.g., 115 and 135) sent by the various devices (e.g., 110 and 130) can be transmitted to the cloud 128 and received by one or more computing devices 180 such as a computer server 145, a smartphone 150, a personal computer 155, a smart tablet 160, or other smart device such as a router 165, and Internet of Things (IOT) appliance or gateway 170, or any other device capable of receiving the wirelessly transmitted telemetry data (e.g., 115 and 135).

The wireless transmissions can use a number of wireless technologies such as Bluetooth®, Bluetooth® Low Energy, code division multiple access (CDMA), global system for mobiles (GSM), general packet radio services (GPRS), long-term evolution (LTE), long range (LoRa), SigFox®, Zigbee®, WiFi®, worldwide interoperability for microwave access (WiMax®), other cellular data protocols, other network types, or the like. In some embodiments, the use of infrared, ultrasonic, or other sound or light based wireless transmission mediums may be used. The beverage asset tracking and monitoring device 110 and/or the receptacle 130 can actively transmit wireless signals (e.g., 115 and 135) capable of being received by the external transceivers 125, which may be of many different types without first receiving a signal from another device, as is the case with many radio frequency ID (RFID) systems. The one or more external transceivers 125 may also be in motion, rather than permanently installed as is also the case in many RFID systems.

The beverage asset tracking and monitoring device 110 can include a user interface 185. The user interface 185 can include a display 132, one or more light emitting diodes (LEDs) 134, a speaker 136, a buzzer 138, one or more push buttons 142, one or more contact switches 144, or the like, which can allow a person to be notified or alerted under a multitude of scenarios. For example, a person can be prompted to select a specific bottle of wine or keg of beer, such as by turning the one or more LEDs 134 on, emitting a sound through the speaker 136, buzzing the buzzer 138, or the like.

The one or more computing devices 180 can include remote logic 182 for causing the one or more LEDs 134 to turn on, the sound to be emitted through the speaker 136, a buzz through the buzzer 138, or the like, for the specific beverage container (e.g., 105). The one or more computing devices 180 can transmit one or more instructions 184 to the beverage asset tracking and monitoring device 110 to cause the one or more LEDs 134 to turn on, the sound to be emitted through the speaker 136, the buzz through the buzzer 138, or the like. Such mechanisms facilitate more time efficient ways to allow a server at a restaurant to identify and locate a specific bottle of wine, for example, which doesn't depend upon a human to scan it or take a picture of a bar code.

Moreover, this technique need not depend on RFID technology. Rather, the specific bottle of wine or groups of bottles can be instantly and positively identified using human senses such as sight (e.g., lit LEDs 134) and sound (e.g., emitted through the speaker 136). Accordingly, it possible for companies to provide employment for untrained and/or unskilled labor because of how easy it becomes to identify and manage inventory, particularly for more esoteric items such as food and beverages. The efficiencies gained through the techniques disclosed herein can facilitate the conversion of a distributor location into a same-day delivery warehouse, for example, by partnering with a delivery company such as Uber®, Grubhub®, DoorDash®, or the like.

Furthermore, a restaurant owner or distributor representative can be alerted to excessively high storage temperatures, which risk damaging a wine. For example, the restaurant owner or distributor representative can access the temperature data 118 using one or more computing devices 180. In some embodiments, an alert or alarm can be sent to the one or more computing devices 180 when temperature exceeds a predefined threshold, so that the restaurant owner or distributor representative can be immediately alerted to the situation.

The one or more push buttons 142 or the one or more contact switches 144 of the user interface 185 can be used to detect whether the beverage asset tracking and monitoring device 110 is affixed to the beverage container 105 based upon physical contact between the beverage asset tracking and monitoring device 110 and the beverage container 105. Alternatively or in addition, the one or more push buttons 142 may be used by a person to prompt the transmission of the marketing or other product-specific data 126 to the smart phone 150, a printer 190, a television display 191, and/or other devices from among the one or more computing devices 180. Alternatively or in addition, the one or more push buttons 142 and the user interface 185 can be used to select a damaged or defective wine to initiate a return process (e.g., return merchandise authorization (RMA) and/or credit).

In some embodiments the printer 190 can be configured as part of the system 100 to print wine lists 152 or other point of sale materials 154 based upon the detected real-time inventory of alcoholic beverages present at the reseller premises. Alternatively or in addition, documents 156 may be automatically printed using the printer 190 when a beverage container 105 is moved to designated locations within the reseller premises based upon configurable preferences and settings in the remote logic 182 and/or the local logic 194. The remote logic 182 and the local logic 194 can include any suitable combination of hardware, software, and/or firmware.

Figure 3A:
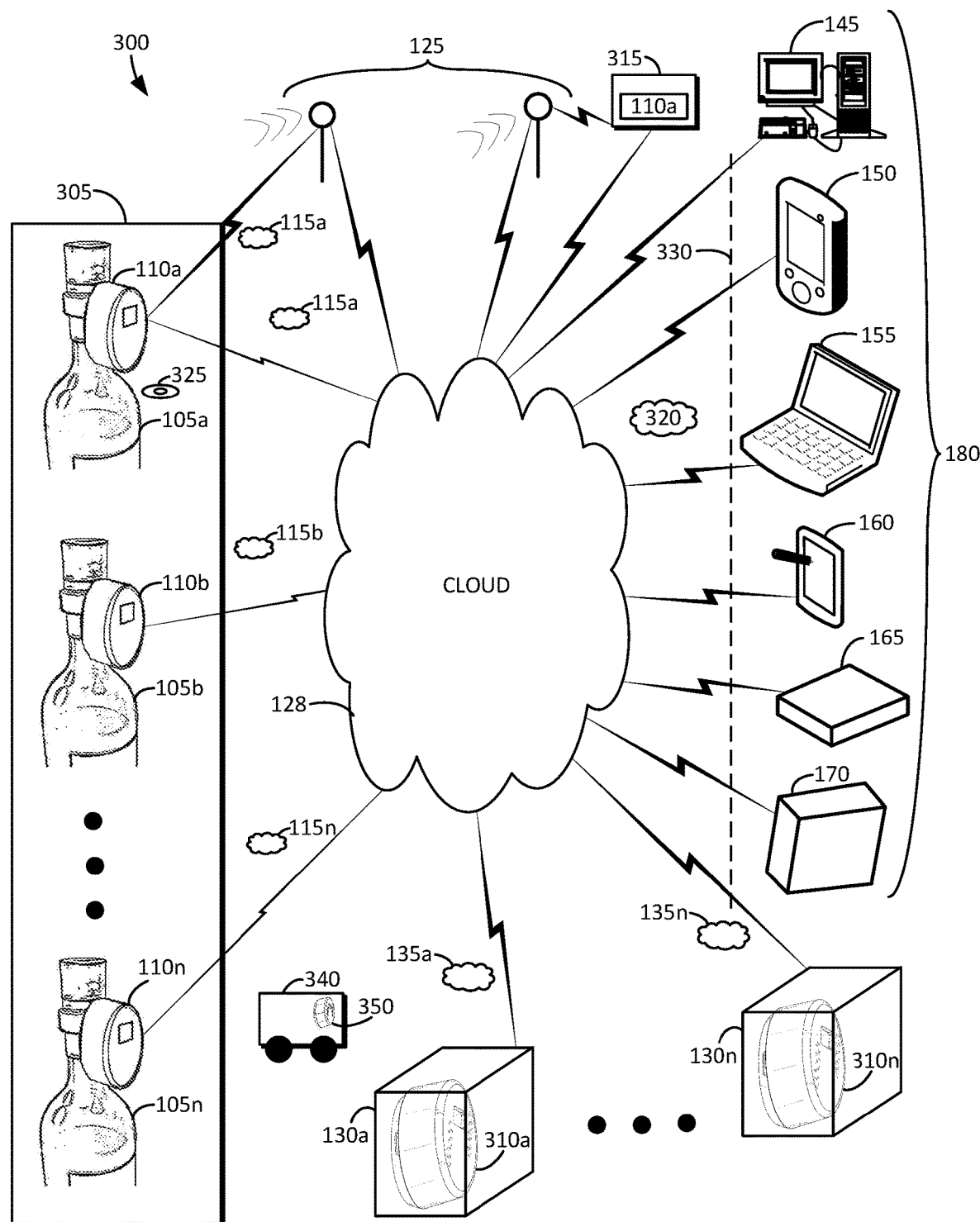
FIG. 3A illustrates a block diagram of another example beverage management system including multiple beverage containers and beverage asset tracking and monitoring devices in accordance with various embodiments of the present inventive concept.

FIG. 3A illustrates a block diagram of another example beverage management system 300 including multiple beverage containers (e.g., 105a, 105b, through 105n) and beverage asset tracking and monitoring devices (e.g., 110a, 110b, through 110n) in accordance with various embodiments of the present inventive concept. Some of the references numerals are the same as those shown in FIG. 1, and therefore, a detailed description of these is not necessarily repeated.

In the system 300, the asset tracking and monitoring devices (e.g., 110a, 110b, through 110n) can each be affixed to a corresponding beverage container (e.g., 105a, 105b, through 105n) such as a bottle or keg, prior to delivery to a reseller destination 305 such as a restaurant. The beverage containers (e.g., 105a, 105b, through 105n) can be tracked and monitored from source to destination. For example, the beverage containers (e.g., 105a, 105b, through 105n) can be tracked and monitored from distributor to reseller. Then, once the beverage containers (e.g., 105a, 105b, through 105n) are at the destination 305, they can be continually monitored until the beverages within the containers are consumed. Alternatively or in addition, the asset tracking and monitoring devices (e.g., 110a, 110b, through 110n) can be affixed to a shipping container 315. The shipping container 315 can be a carton that contains the beverage containers, a box that contains the beverage containers, a case that contains the beverage containers, or the like.

The telemetry data (e.g., 115a, 115b, through 115n) transmitted by the beverage asset tracking and monitoring devices (e.g., 110a, 110b, through 110n) and collected by the one or more computing devices 180 may be used to automatically count the inventory of alcoholic beverages as well as determine the number of bottles or kegs sold to customers of the reseller location 305. For example, the one or more computing devices 180 can receive the telemetry data (e.g., 115a, 115b, through 115n) via the cloud 128 and automatically determine the inventory of alcoholic beverages as well as determine the number of bottles or kegs sold to customers of the particular reseller location 305. The one or more computing devices 180 can do this for multiple restaurants or grocery stores each having dozens or hundreds of beverage containers. This enables the efficient management of both taking inventory as well as managing orders from beverage distributors to replenish sold inventory or order new inventory to meet increased customer demand The use of the term "real-time inventory management" in this context refers to the automated counting of inventory of alcoholic beverages located at a reseller premises (e.g., 305) with synchronization of this data to one or more computing devices 180. The synchronization can occur continually or at configurable time intervals, and/or in response to events such as excessive temperature, vibration, and light levels.

The management system 300 provides the ability not just to count inventory, but to determine whether the beverage asset tracking and monitoring devices (e.g., 110a, 110b, through 110n) are removed from the corresponding beverage container (e.g., 105a, 105b, through 105n), which can indicate that they have been consumed at the reseller premises 305. This provides the ability to obtain sales metrics for beverages consumed onsite without needing to integrate with or alternatively provide point of sales (POS) functionality or integrate in a payment processing system or related APIs.

The receptacles (e.g., 130a through 130n) can hold corresponding beverage asset tracking and monitoring devices (e.g., 310a through 310n). The receptacles (e.g., 130a through 130n) can transmit telemetry data (e.g., 135a through 135n) to the one or more computing devices 180 via the cloud 128. The one or more computing devices 180 can automatically determine the inventory of alcoholic beverages for a particular reseller (e.g., destination 305) as well as determine the number of bottles or kegs sold to customers based on the telemetry data (e.g., 135a through 135n). In some embodiments, the one or more computing devices 180 can automatically make such determinations based on all of the telemetry data (e.g., 115a, 115b, through 115n, and 135a through 135n).

The telemetry data (e.g., 115a, 115b, through 115n, and 135a through 135n) sent by the various devices (e.g., 110a, 110b, through 110n, and 130a through 130n) and used within the system 300 can be transmitted at either fixed intervals or dynamically adjusted intervals based upon either recent motion of a beverage container (e.g., 105a, 105b, through 105n) or as selected by a person using an application and interface provided on the one or more computing devices 180, via a web site, or other software client or API call. In some embodiments, a real-time clock can also be utilized to adjust transmission intervals based upon time of day. Different modes of operation are supported to maximize battery life, minimize RF channel conflicts and collisions, and/or minimize the latency of counting inventory and other telemetry data from specific devices from among the various devices (e.g., 110a, 110b, through 110n, and 130a through 130n). The ability to balance between these different modes of operations provides support for either a very large number of associated beverage containers located in close proximity to each other, or alternatively, to increase the rate at which telemetry data is sent when a lesser number of beverage containers is present, and thus RF bandwidth or chance of collisions is unlikely. Control of transmission settings can be set on the one or more computing devices 180, and configuration settings 320 can be broadcast to one or multiple of the devices (e.g., 110a, 110b, through 110n, and 130a through 130n) located at a reseller location (e.g., destination 305) using a wired or wireless transceiver. In the case of a wireless transceiver, it can be compatible with any suitable RF technology and a protocol.

In some embodiments, the control of transmission settings and configuration settings 320 can be performed on the same device used (e.g., 180) that receives the telemetry data. In alternate embodiments, the control of transmission settings and configuration settings 320 can be performed on a separate device (not shown). In some embodiments, the various control devices (e.g., 180) can optionally incorporate a transceiver capable of broadcasting the configuration settings 320 to one, some, or all of the various devices (e.g., 110a, 110b, through 110n, and 130a through 130n), which may lack this specific functionality.

When a smartphone, tablet, or personal computer is used as a computing device 180 to receive the telemetry data (e.g., 115a, 115b, through 115n) then training, marketing materials, point of sale materials, inventory management, and order management functions can be provided by an installable application installed on the computing device 180. The beverage asset tracking and monitoring devices (e.g., 110a, 110b, through 110n) described herein are designed to be used multiple times and are not generally intended to be disposed of when an empty beverage container (e.g., 105a, 105b through 105n) is discarded. As such the beverage asset tracking and monitoring devices can incorporate replaceable and/or rechargeable batteries 325. The use of inductive charging technologies is beneficial in some embodiments of the inventive system. In other words, the rechargeable batteries 325 can be recharged using an inductive battery charger so that it doesn't need to be removed from the beverage asset tracking and monitoring device (e.g., 110a) when being charged. The one or more computing devices 180 which may be integrated with the system 300 can provide application programming interfaces (APIs) 330, which facilitate integration with 3rd parties. The APIs 330 can include inventory management and/or demand planning capability used by a supplier, producer, or distributor of alcoholic beverages. The APIs 330 can also facilitate integration with electronic menu or online reservation management systems (not shown). In some cases a customer may choose to reserve a bottle of wine that a particular restaurant has in inventory or alternatively request a bottle of wine that is not in inventory at the restaurant at the time a reservation is made, and/or that can be delivered before the scheduled reservation time and date. Alternatively or in addition, integration with route accounting systems and/or computer aided dispatch (CAD) systems (not shown) allows for the utilization of independent contractors to perform "last mile" delivery from distributor to reseller, e.g., from warehouse locations to restaurants.

In some jurisdictions, resellers cannot purchase alcoholic beverages from distributors on credit. The system 300 allows a restaurant to make more frequent orders for smaller quantities of alcoholic beverages. This allows a restaurant to better manage cash flow, reduce their financial risk in holding alcoholic beverages in their inventory that are not selling well, as well as offer a greater variety of alcoholic beverages than previously practical for them to do.

In some embodiments, a wheeled cart 340 includes a beverage asset tracking and monitoring device (e.g., 350). The wheeled cart 340 can be a smart cart that instructs employees or contractors in the performance of supply chain logistical tasks. The smart cart 340 can be moved between zones within a warehouse to facilitate transfers and deliveries of beverage containers. In some embodiments, all items held in inventory can be contained within one or more smart carts 340. The smart carts 340 can be of various sizes, but in some embodiments can hold between three to six cases and/or cartons of items such as wine. The beverage asset tracking and monitoring device (e.g., 350) enables real-time tracking, which allows the position of each smart cart 340, and thus the items contained within them to be known at all times. Tasks can be generated to facilitate the movement of the smart carts 340 to particular zones in the warehouse to speed the performance of transfer orders and predicted orders.

For example, when a winery or their agent arrives to deliver on an order, the delivery can be directed to a designated receiving area. A computing device such as a tablet 160 or a smart phone 150 can display the order to be received. Selecting the order can prompt the person delivering the items to place those items into one or multiple smart carts 340. The smart carts 340 can be equipped with a beverage asset tracking and monitoring device (e.g., 110c), thereby facilitating the ability to know in real-time the location of the delivery, which can also be easily identified using the LEDs or speaker of the beverage asset tracking and monitoring device 110c. The items (e.g., beverage containers, cases, boxes, cartons, etc.) can be placed into the smart carts 340. A task may be generated at this time to prompt the attachment of a new beverage asset tracking and monitoring device onto each item (e.g., beverage containers, cases, boxes, cartons, etc.).

Beverage asset tracking and monitoring devices (e.g., 110) can be associated to individual items (e.g., a single beverage container) as well as cases containing a known quantity of items (e.g., of a single SKU or homogeneous type). Tasks can be generated to prompt contractors or employees to attach asset tracking and monitoring devices (e.g., 110) to specific cases or individual items, such as a bottle of wine. Cases of wine can continue to be held in the smart carts 340. Individual items can be placed onto racks in specific zones within a warehouse equipped for the purpose of facilitating deliveries. The number of individual items tagged and associated with asset tracking and monitoring devices (e.g., 110) can be determined and/or improved using predictive analytics.

The management system 300 is distinct from systems that incorporate technologies such as RFID (e.g., using active or passive tag), QR codes, bar codes, and the like. Systems utilizing these technologies require the use of components such as antennas, RFID readers, cameras, or bar code scanners. Planning and implementing such a system is both complex and constrained in the locations where deployments can technically function. In particular, RFID readers and antennas have a wireless range of only a few meters. The system 300 and beverage asset tracking and monitoring devices 110 described herein have sufficient wireless range that the external transceivers 125 can be placed anywhere within a restaurant which is both practical and convenient. In addition, the beverage containers (e.g., 105a, 105b, through 105n) can be stored in multiple locations within the restaurant 305 with no impairment of functionality. This is not financially or logistically feasible with existent asset tracking technologies such as RFID.

Figure 3B:
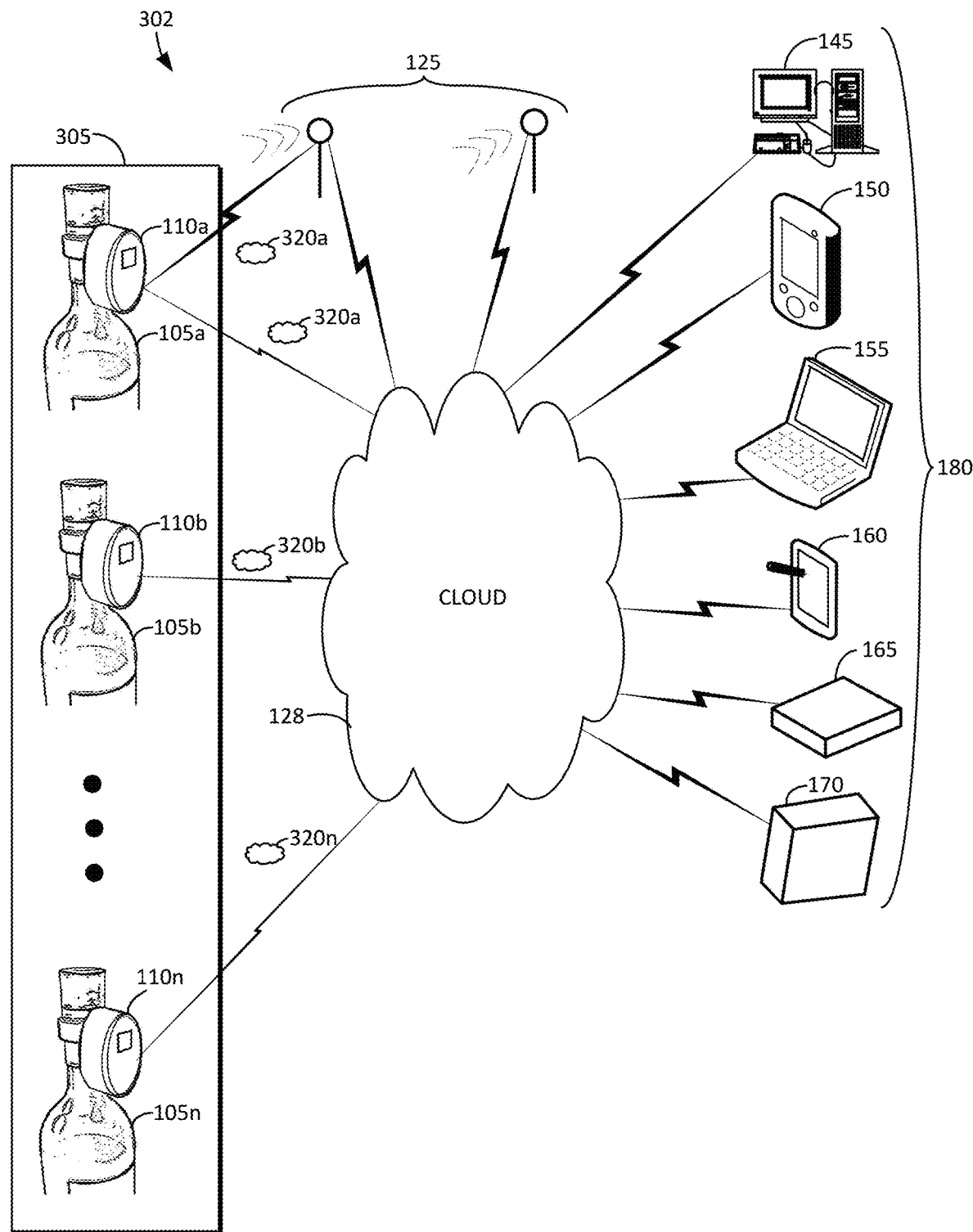
FIG. 3B illustrates a block diagram of yet another example beverage management system including multiple beverage containers and beverage asset tracking and monitoring devices in accordance with various embodiments of the present inventive concept.

FIG. 3B illustrates a block diagram of yet another example beverage management system 302 including multiple beverage containers (e.g., 105a, 105b, through 105n) and beverage asset tracking and monitoring devices (e.g., 110a, 110b, through 110n) in accordance with various embodiments of the present inventive concept. Some of the reference numerals are the same as what is shown and described in FIG. 3A, and for the sake of brevity a detailed description of such is not necessarily repeated.

In some embodiments, the one or more computing devices 180 can identify a specific type of alcoholic beverage according to a specific criteria, and transmit one or more instructions (e.g., 320a, 320b, through 320n) to one or more of the beverage asset tracking and monitoring devices (e.g., 110a, 110b, through 110n) that are affixed to beverage containers corresponding to the specific type of alcoholic beverage. The one or more instructions (e.g., 320a, 320b, through 320n) can cause one or more of the beverage asset tracking and monitoring devices to turn on the one or more LEDs 134 (of FIG. 1), emit a sound via the speaker 136 (of FIG. 1), buzz a buzzer 138 (of FIG. 1), or the like, via the user interface (e.g., 185 of FIG. 1). Accordingly, a reseller such as a restaurateur can quickly and easily locate one or more bottles of alcohol having the specific criteria at a particular location where the beverages are stored.

Figure 4:
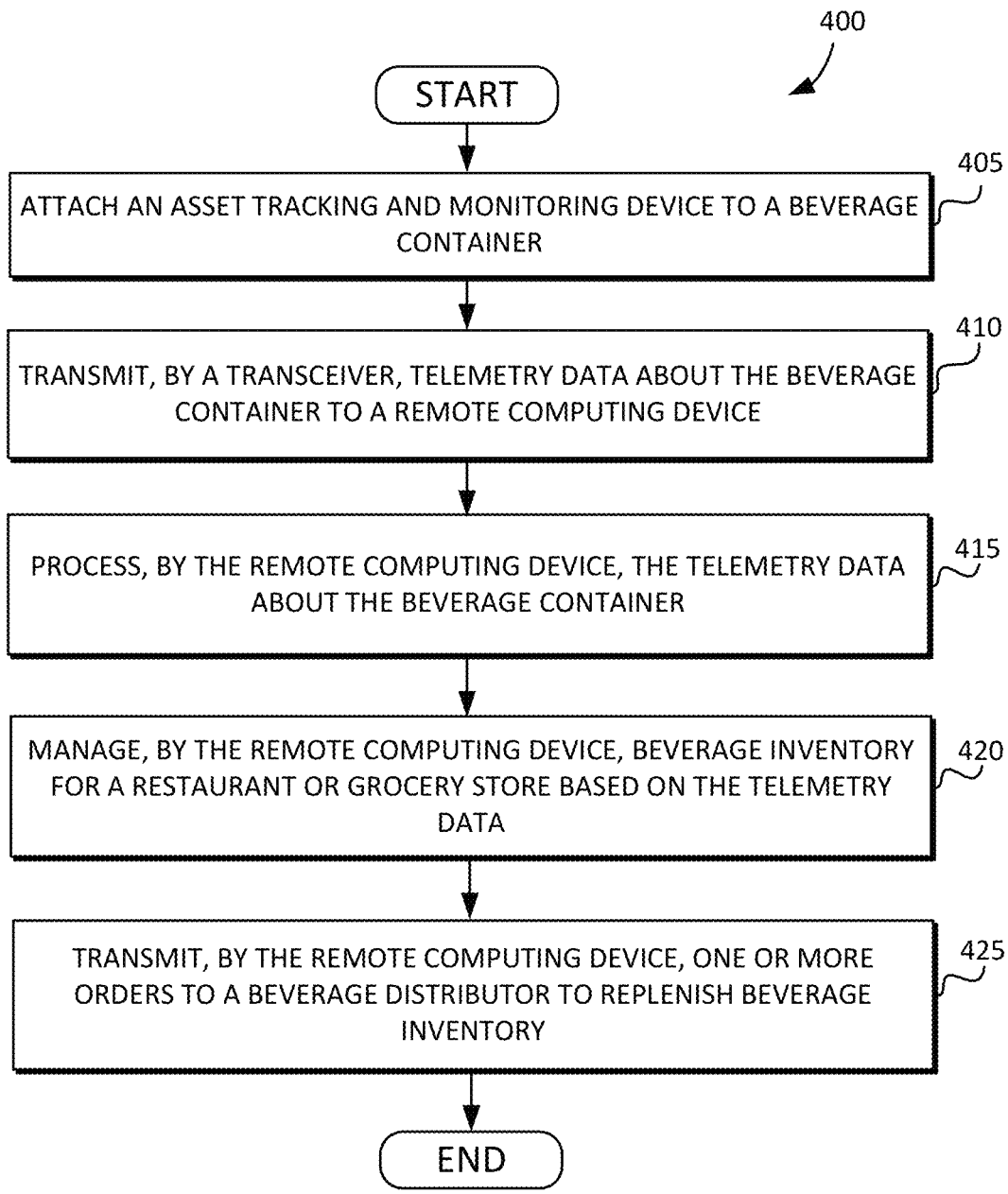
FIG. 4 is a flow diagram illustrating a technique for tracking and monitoring beverage inventory in accordance with various embodiments of the present inventive concept.

FIG. 4 is a flow diagram 400 illustrating a technique for tracking and monitoring beverage inventory in accordance with various embodiments of the present inventive concept. At 405, an asset tracking and monitoring device is attached to a beverage container. At 410, telemetry data about the beverage container is transmitted to a remote computing device. At 415, the remote computing device processes the telemetry data about the beverage container. At 420, the remote computing device manages beverage inventory for a restaurant or grocery store based on the telemetry data. At 425, the remote computing device transmits one or more orders to a beverage distributor to replenish beverage inventory. It will be understood that the steps illustrated in FIG. 4 need not be performed in the order shown, i.e., the steps can be performed in a different order or with intervening steps.

Figure 5:
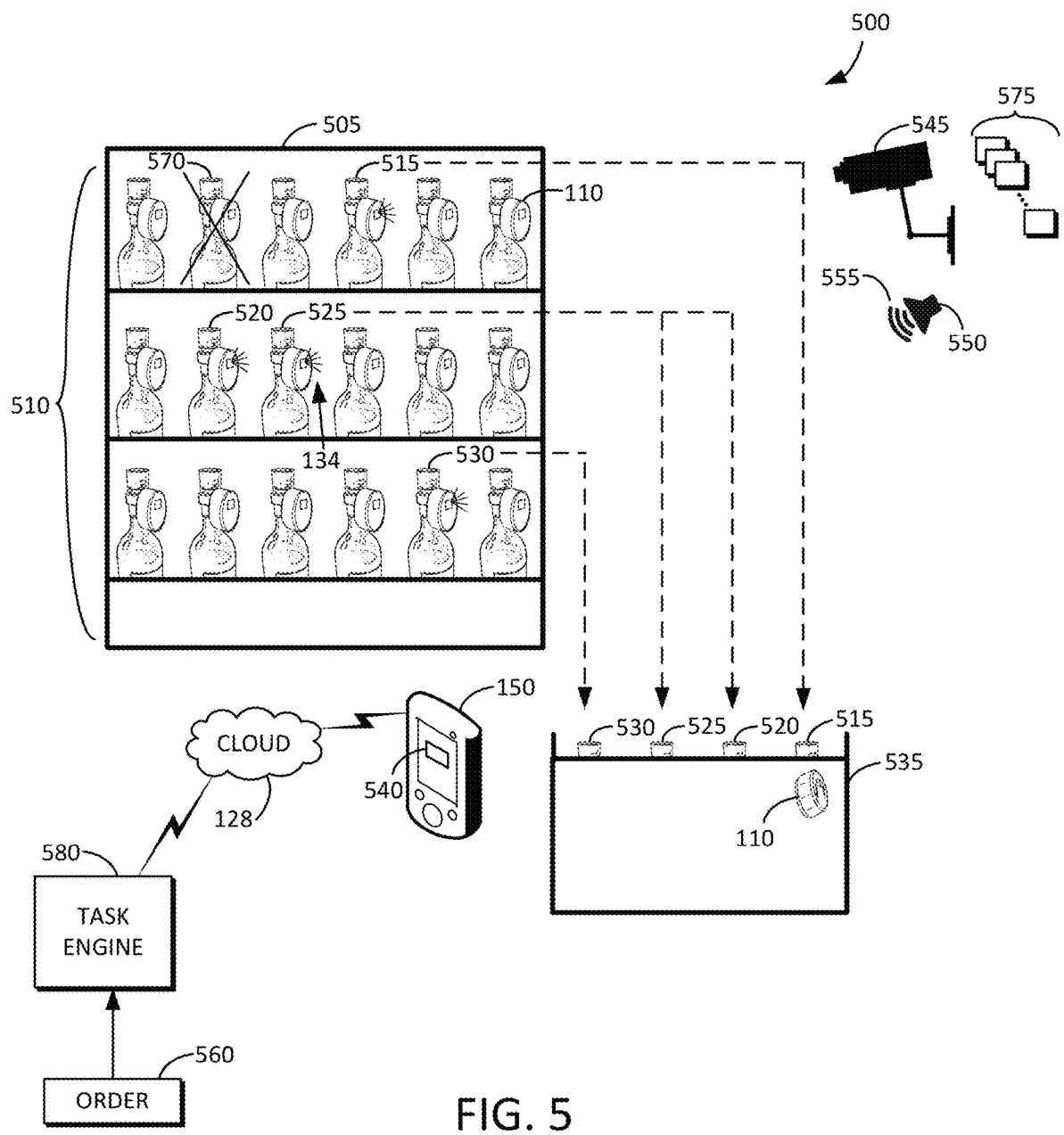
FIG. 5 illustrates a management system for improving supply chain logistical operations and inventory management that facilitates a highly efficient and low-error-rate picking and packing operation of beverages contained within an order prior to delivery to a reseller, in accordance with various embodiments of the present inventive concept.

FIG. 5 illustrates a management system 500 for improving supply chain logistical operations and inventory management that facilitates a highly efficient and low-error-rate picking and packing operation of beverages contained within an order prior to delivery to a reseller. The management system 500 can be located within a wholesaler or distributor location.

The management system 500 includes a task engine 580, which can guide contractors or employees of the distributor in the performance of order picking and packing tasks. The task engine 580 can reside on the computing device 150, or alternatively can reside on a different computing device (e.g., 180) accessible via the cloud 128. The distributor may have a rack or shelf 505 of beverage containers 510 (e.g., 105 of FIG. 1) having beverages therein. For each beverage container (e.g., 515, 520, 525, and 530) on a particular order 560, an associated LED 134 of a corresponding beverage asset tracking and monitoring device 110 lights up. The order 560 can be a purchase order, a customer order, a transfer order, or the like. Contractors or employees performing a picking task can be instructed by a mobile computing device (e.g., smart phone 150) with a message 540 indicating when they are allowed to remove a subset (e.g., 515, 520, 525, and 530) of the beverage containers 510 with the lit up LED 134 from racks or shelves (e.g., 505) and place them into one or more shipping containers (e.g., 535). The one or more shipping containers 535 can include a carton that contains the beverage containers, a box that contains the beverage containers, a case that contains the beverage containers, or the like. Should a wrong (i.e., having an unlit LED) beverage container (e.g., 570) be removed from the rack or shelf 505, an audible warning 555 from a speaker 550 can be automatically emitted and an associated camera 545 can automatically capture one or more pictures 575 to provide evidence should there be malicious intent by the person picking and packing the order 560. Alternatively or in addition, the audible warning 555 may be emitted from the mobile computing device (e.g., smart phone 150) itself. Alternatively or in addition, the audible warning 555 may be emitted from one or more of the beverage asset tracking and monitoring devices 110. In some embodiments, the camera 545 can be continually running so as to capture a complete history of events. Alternatively, the camera 545 can be activated when the wrong beverage container (e.g., 570) is attempted to be removed from the rack or shelf 505, and then capture a predefined number of the one or more pictures.

When the picking and packing of the order 560 has been completed, the one or more shipping containers (e.g., 535) contain the appropriate kind and number of beverage containers (e.g., 515, 520, 525, and 530) and associated beverages therein for that particular order 560. In some embodiments, a beverage asset tracking and monitoring device 110 can be attached to an outer part of the one or more shipping containers (e.g., 535). The beverage asset tracking and monitoring device 110 attached to the outer part of the one or more shipping containers (e.g., 535) can guide the selection of shipping containers for placement onto a pallet, for example, as explained in further detail below.

The task engine 580 can perform one or more high-level sets of functions. First, the task engine 580 can generate tasks needed to be performed by contractors or employees. Second, the task engine 580 can monitor the completion status of tasks. A task in this context can refer to multiple actions that need to be performed. The tasks can be related to logistical operations. For example, a task can include picking items, packing items, moving items from one area of the warehouse to another, associating a beverage asset tracking and monitoring device 110 to a particular food item, and/or counting of inventory.

There can include three broad categories of tasks managed by the task engine (e.g., 580 of FIG. 5). The task of "receiving" relates to the receipt of items contained on purchase orders from distributors, and the association of those items into the management system (e.g., 500 of FIG. 5) so that the tasks can be performed. The task of "transfers" relates to the movement of items between warehouses or between areas within a single warehouse. The task of "deliveries" encompasses the process of picking, packing, and delivering items that have been ordered by customers.

Figure 6:
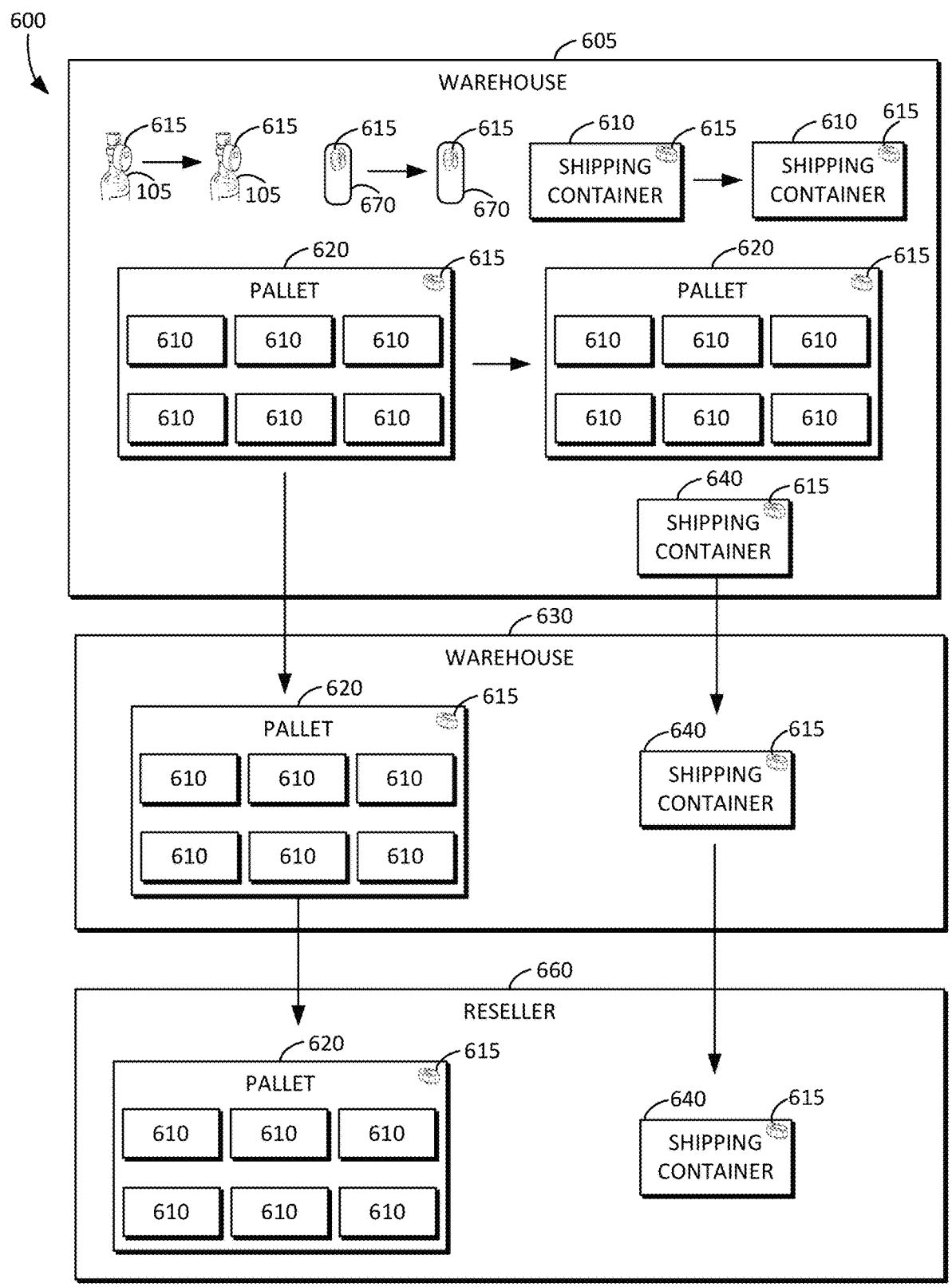
FIG. 6 is a block and flow diagram illustrating a technique for improving supply chain logistical operations and inventory management of food and beverages in accordance with various embodiments of the present inventive concept.

FIG. 6 is a block and flow diagram 600 illustrating a technique for improving supply chain logistical operations and inventory management of food and beverages in accordance with example embodiments described herein. Efficient movement of inventory within a warehouse (e.g., 605), and between warehouses (e.g., 605 and 630), is crucial for cost controlling the complexities of supply chain logistical operations and inventory management of food and beverages. Food and beverage asset tracking and monitoring devices (e.g., 615) can be attached to or otherwise associated with individual beverage containers (e.g., 105), individual food containers (e.g., 670), and/or individual shipping containers (e.g., 610 and 640). The shipping containers (e.g., 610 and 640) can be a carton that contains individual food or beverage containers, a box that contains individual food or beverage containers, a case that contains individual food or beverage containers, a keg, a can, or the like. Put differently, the food and beverage asset tracking and monitoring devices (e.g., 615) can be attached to a bottle, a case, a box, a container, a pallet, a keg, a carton, a can, or the like, and can be automatically identified and tracked accordingly as disclosed herein. The individual shipping containers (e.g., 610 and 640) can contain, for example, one or more beverage containers 105 and/or one or more food containers 670. The food and beverage asset tracking and monitoring devices (e.g., 615) can be attached to or otherwise associated with individual pallets (e.g., 620). The individual pallets (e.g., 620) can include one or more shipping containers (e.g., 610, 640). The food and beverage asset tracking and monitoring devices (e.g., 615) can be similar to or the same as the asset tracking and monitoring device 110 described above, yet can be used to track and manage beverage containers (e.g., 105), food containers (e.g., 670), shipping containers (e.g., 610 and 640), and/or pallets (e.g., 620).

For example, the asset tracking and monitoring devices 615 can be used to identify and/or track an individual beverage container 105 from one location within the warehouse 605 to another location in the warehouse 605. By way of another example, the asset tracking and monitoring devices 110 can be used to identify and/or track an individual food container 670 from one location within the warehouse 605 to another location in the warehouse 605. By way of yet another example, the asset tracking and monitoring devices 110 can be used to identify and/or track an individual shipping container 610 from one location within the warehouse 605 to another location in the warehouse 605. By way of still another example, the asset tracking and monitoring devices 110 can be used to identify and/or track an individual pallet 620 from one location within the warehouse 605 to another location in the warehouse 605.

Moreover, the asset tracking and monitoring devices 615 can be used to track and manage shipping containers (e.g., 640) and/or pallets (e.g., 620) between two different warehouses. For example, the asset tracking and monitoring devices 615 can be used to identify, track, and manage a shipping container (e.g., 640) between the warehouse 605 and the warehouse 630. By way of another example, the asset tracking and monitoring devices 615 can be used to identify, track, and manage a pallet (e.g., 620) between the warehouse 605 and the warehouse 630.

Further down the supply chain, the asset tracking and monitoring devices 615 can be used to track and manage shipping containers (e.g., 640) and/or pallets (e.g., 620) between a warehouse (e.g., 630) and a reseller location (e.g., 660). For example, the asset tracking and monitoring devices 615 can be used to identify, track, and manage a shipping container (e.g., 640) between the warehouse 630 and a reseller location 660, such as a store or restaurant. By way of another example, the asset tracking and monitoring devices 615 can be used to identify, track, and manage a pallet (e.g., 620) between the warehouse 630 and the reseller location 660. Accordingly, the asset tracking and monitoring devices 615 can be used to guide contractors or employees regarding which inventory should be transferred from one location to another, either within the same warehouse (e.g., 605), between warehouses (e.g., 605 and 630), and/or between a warehouse and a reseller location (e.g., 630 and 660). Contractors or employees performing a supply chain logistical operation can be instructed by a mobile computing device (e.g., smart phone 150) with a message (e.g., 540 of FIG. 5) indicating when they are allowed to move a beverage container, a food container, a shipping container, or a pallet with the lit up LED 134 from one location to another location.

Embodiments described herein provide improved supply chain logistical operations including greater speed and accuracy, and the ability in real-time to audit the performance of logistical tasks. An end-to-end model of logistical operations facilitates the provision of a quantity of asset tracking and monitoring devices 615 to distributors, that they can attach to food or beverage containers that are part of an order prior to delivering them to the resellers. In some embodiments, a 3rd party logistics (3PL) provider may provide the asset tracking and monitoring devices 615 a distributor within the supply chain. This allows products on an order to be automatically inventoried and received. Further, it allows for real-time tasking of contractors or employees to perform logistics operations such as inventory transfers between or within warehouses, picking and packing of customer orders, and inventory transfers between a distributor warehouse and a reseller location.

Transfers can be within zones of a warehouse or between warehouses. For the latter, a transfer order is generated. A transfer order can be sent to 3PL providers or other qualified employees, contractors, or agents who are then responsible to transport the food or beverage items on the transfer order. A smart cart (e.g., 340 of FIG. 3A) or multiple smart carts can be associated with a transfer order. Food and beverage items to be transferred can be placed in the designated smart cart. These tasks can be performed in advance of or at the time that a person or persons responsible to receive the items on a transfer order are present. The terms picking and packing can be used in this context.

Deliveries of orders to customers can have associated therewith pick, pack, and delivery tasks. All three of these tasks can be performed by the same person, generally a contractor, but can also be performed by multiple people. An order may contain a mix of cases of items as well as individual items. In either case, the asset tracking and monitoring devices (e.g., 615) can be associated to the items contained within the order. The asset tracking and monitoring devices (e.g., 615), in combination with a mobile computing device (e.g., 150) can prompt and oversee the performance of order picking and packing tasks.

Figure 7:
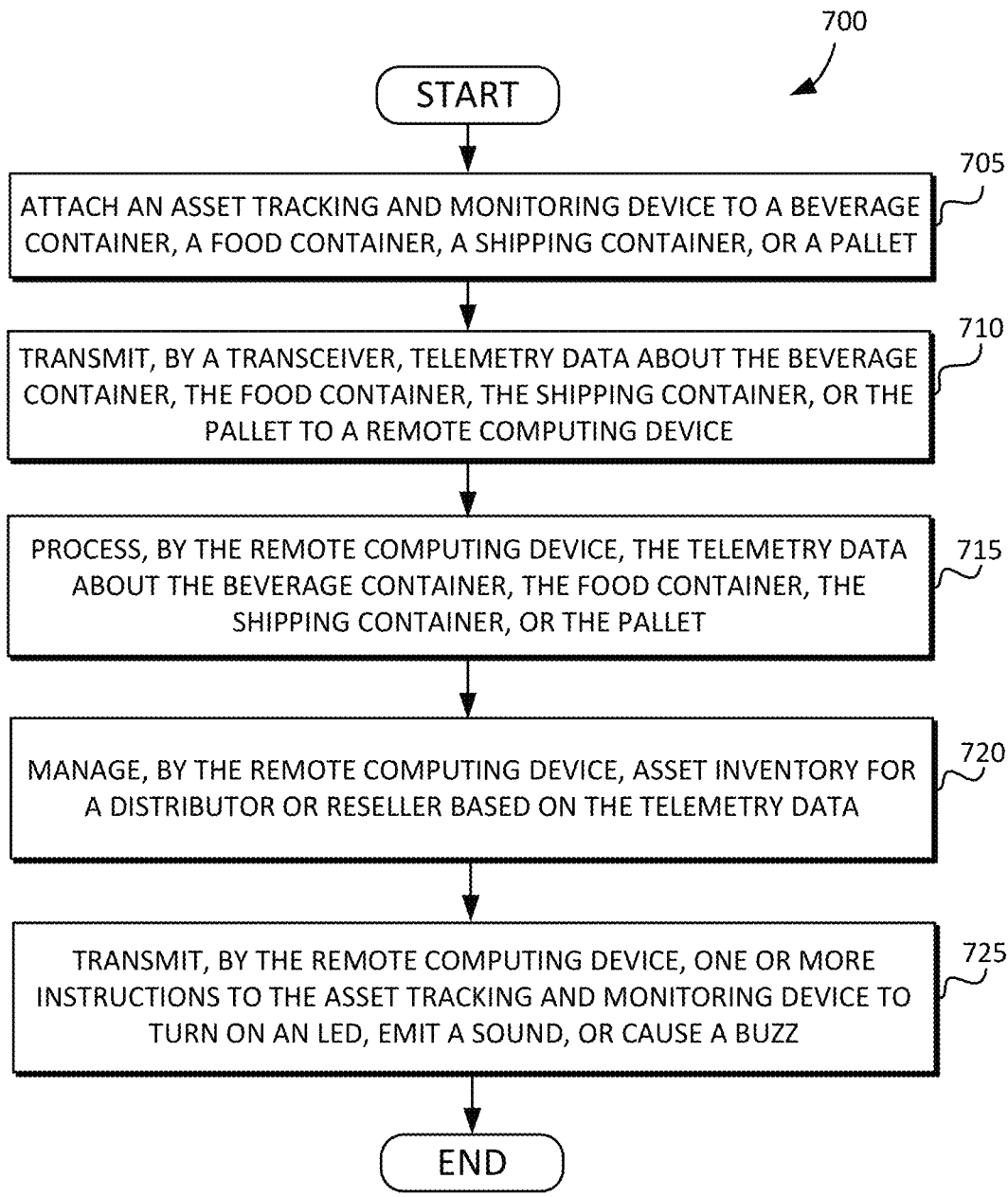
FIG. 7 is a flow diagram illustrating a technique for improving supply chain logistical operations and inventory management of food and beverages in accordance with various embodiments of the present inventive concept.

FIG. 7 is a flow diagram 700 illustrating a technique for improving supply chain logistical operations and inventory management of food and beverages in accordance with various embodiments of the present inventive concept. At 705, an asset tracking and monitoring device is attached to a beverage container, a food container, a shipping container, or a pallet. At 710, telemetry data about the beverage container, the food container, the shipping container, or the pallet is transmitted to a remote computing device. At 715, the remote computing device processes the telemetry data about the beverage container, the food container, the shipping container, or the pallet. At 720, the remote computing device manages asset inventory for a distributor or reseller based on the telemetry data. At 725, the remote computing device transmits one or more instructions to the asset tracking and monitoring device to turn on an LED, emit a sound, or cause a buzz. It will be understood that the steps illustrated in FIG. 7 need not be performed in the order shown, i.e., the steps can be performed in a different order or with intervening steps.

Figure 8:
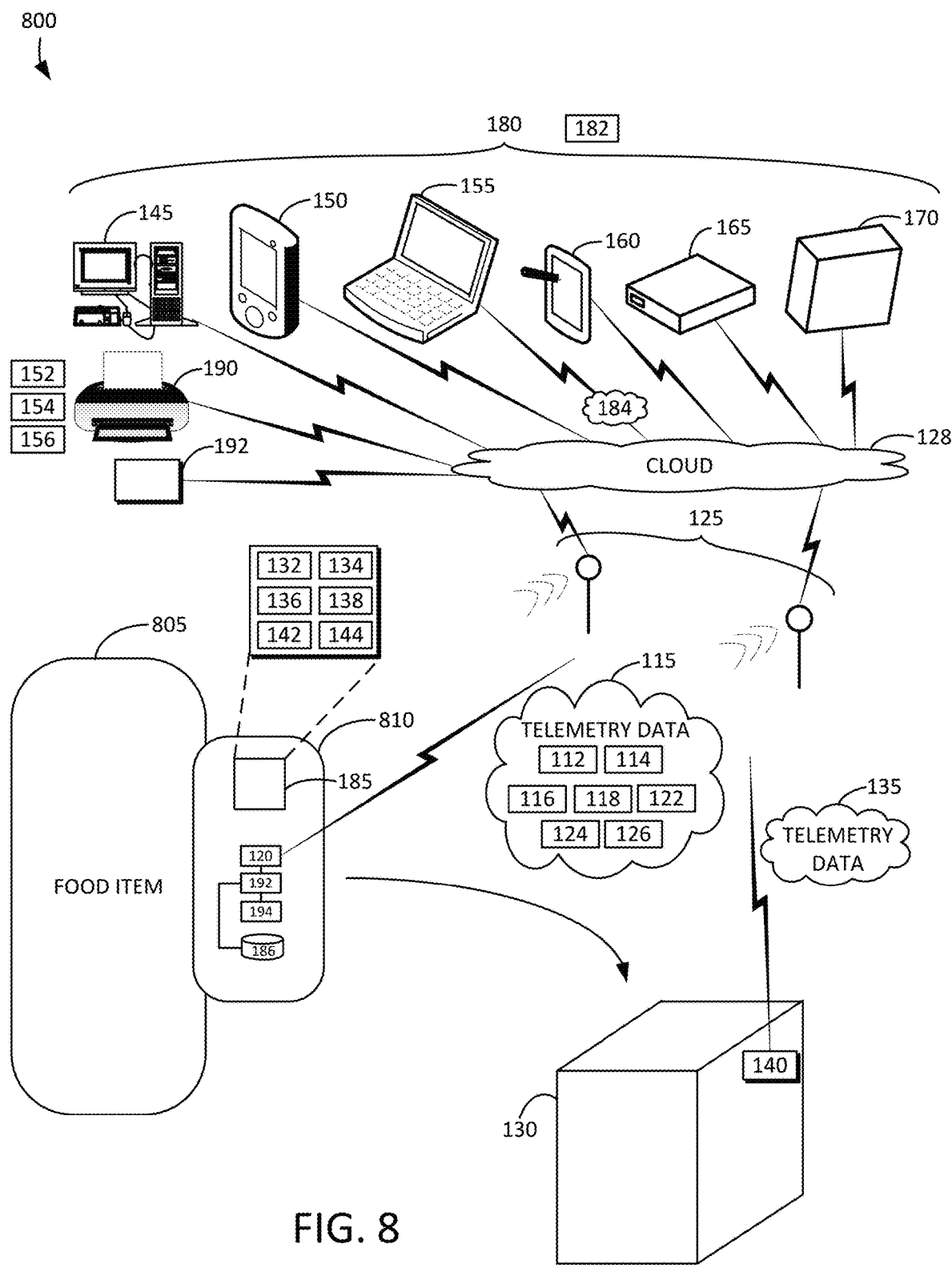
FIG. 8 illustrates a block diagram of an example food container management system including a food container and a food asset tracking and monitoring device attached thereto in accordance with various embodiments of the present inventive concept.

FIG. 8 illustrates a block diagram of an example food container management system 800 including a food container 805 and a food asset tracking and monitoring device 810 attached thereto in accordance with various embodiments of the present inventive concept. The food container 805 can be any suitable food packaging. The food asset tracking and monitoring device 810 can be attached to the food container 805. The food asset tracking and monitoring device 810 can include an outer housing that is made of a hard material such as plastic, metal, a composite material, or the like. The outer housing of the food asset tracking and monitoring device 810 can contain various electronic components as further described below. The food asset tracking and monitoring device 810 need not have the same shape as the asset tracking and monitoring device 110 shown in FIG. 2.

The food asset tracking and monitoring device 810 can transmit telemetry data 115 using an embedded wireless communication device 120. The embedded wireless communication device 120 can be a transmitter, a receiver, and/or a transceiver. For the sake of brevity in description, the embedded wireless communication device 120 is generally referred to herein as a transceiver. The food asset tracking and monitoring device 810 can further include a microprocessor 192, local control logic 194, and/or a local storage device 186. The local storage device 186 can include volatile memory such as DRAM and/or non-volatile memory such as flash memory or an SSD. The local storage device 186 can store identification and tracking information discussed below, and can provide the identification and tracking information to the wireless communication device 120, which can then be transmitted to an external computing device (e.g., 180), for example, by way of an intermediate transceiver (e.g., 125).

The telemetry data 115 can include, for example, motion data 112 that correlates to motion of the food container 805, location data 114 using global positioning system (GPS) technology that correlates to a location of the food container 805, dead reaconing technology that correlates to a location of the food container 805, inertial navigation technology that correlates to a location of the food container 805, and/or other suitable location-detection technologies. The telemetry data 115 can include tilt angle of the food container 805. The telemetry data 115 can include proximity data 116 that includes information regarding proximity of the food container 805 to a known location, temperature data 118 that correlates to the temperature of the food container 805 and/or to ambient temperature, light intensity 122 data that correlates to the intensity of light in an area in which the food container 805 is located, vibration data 124 that correlates to an amount of vibration of the food container 805, marketing or other product-specific data 126, or the like.

The management system 800 may include one or more external transceivers 125 capable of receiving the telemetry data 115. The one or more external transceivers 125 are external relative to the food asset tracking and monitoring device 810. When determining location of the food container 805 without access to GPS data, the location of one or more external transceivers 125 allows the proximity of the transmitting device 810 to be determined, and therefore, the proximity of the food container 805 can also be determined. The one or more external transceivers 125 may include a WiFi transceiver, a cellular transceiver, or other suitable RF transceiver.

The motion telemetry data 112 also provides the ability to determine whether or not the food asset tracking and monitoring device 810 has been removed from the food container 805. In some embodiments, after removal of the food asset tracking and monitoring device 810 from the food container 805, the food asset tracking and monitoring device 810 can be placed into a designated receptacle 130. The receptacle 130 can include a wireless communication device 140. The wireless communication device 140 can be a transmitter, a receiver, and/or a transceiver. For the sake of brevity in description, the wireless communication device 140 is generally referred to herein as a transceiver.

The transceiver 140 of the receptacle 130 can transmit telemetry data 135 to the one or more external transceivers 125. The telemetry data 135 can be similar to or the same as the telemetry data 115 described above. In some embodiments, the transceiver 140 automatically transmits the telemetry data 135 upon insertion of the food asset tracking and monitoring device 810 into the receptacle 130. The telemetry data (e.g., 115 and 135) sent by the various devices (e.g., 810 and 130) can be transmitted to the cloud 128 and received by one or more computing devices 180 such as a computer server 145, a smartphone 150, a personal computer 155, a smart tablet 160, or other smart device such as a router 165, and Internet of Things (IOT) appliance or gateway 170, or any other device capable of receiving the wirelessly transmitted telemetry data (e.g., 115 and 135).

The wireless transmissions can use a number of wireless technologies such as Bluetooth®, Bluetooth® Low Energy, CDMA, GSM, GPRS, LTE, LoRa, SigFox®, Zigbee®, WiFi®, WiMax®, other cellular data protocols, other network types, or the like. In some embodiments, the use of infrared, ultrasonic, or other sound or light based wireless transmission mediums may be used. The food asset tracking and monitoring device 810 and/or the receptacle 130 can actively transmit wireless signals (e.g., 115 and 135) capable of being received by the external transceivers 125, which may be of many different types without first receiving a signal from another device, as is the case with many radio frequency ID (RFID) systems. The one or more external transceivers 125 may also be in motion, rather than permanently installed as is also the case in many RFID systems.

The food asset tracking and monitoring device 810 can include a user interface 185. The user interface 185 can include a display 132, one or more light emitting diodes (LEDs) 134, a speaker 136, a buzzer 138, one or more push buttons 142, one or more contact switches 144, or the like, which can allow a person to be notified or alerted under a multitude of scenarios. For example, a person can be prompted to select a specific food container, such as by turning the one or more LEDs 134 on, emitting a sound through the speaker 136, buzzing the buzzer 138, or the like.

The one or more computing devices 180 can include remote logic 182 for causing the one or more LEDs 134 to turn on, the sound to be emitted through the speaker 136, a buzz through the buzzer 138, or the like, for the specific food container (e.g., 805). The one or more computing devices 180 can transmit one or more instructions 184 to the food asset tracking and monitoring device 810 to cause the one or more LEDs 134 to turn on, the sound to be emitted through the speaker 136, the buzz through the buzzer 138, or the like. Such mechanisms facilitate more time efficient ways locate a specific food container, for example, which doesn't depend upon a human to scan it or take a picture of a bar code.

Moreover, this technique need not depend on RFID technology. Rather, the specific food items or groups of food items can be instantly and positively identified using human senses such as sight (e.g., lit LEDs 134) and sound (e.g., emitted through the speaker 136). Accordingly, it is possible for companies to provide employment for untrained and/or unskilled labor because of how easy it becomes to identify and manage inventory, particularly for more esoteric items such as food and beverages. The efficiencies gained through the techniques disclosed herein can facilitate the conversion of a distributor location into a same-day delivery warehouse, for example, by partnering with a delivery company such as Uber®, Grubhub®, DoorDash®, or the like.

Furthermore, a grocery store owner or distributor representative can be alerted to excessively high storage temperatures, which risk damaging a wine. For example, the grocery store owner or distributor representative can access the temperature data 118 using one or more computing devices 180. In some embodiments, an alert or alarm can be sent to the one or more computing devices 180 when temperature exceeds a predefined threshold, so that the grocery store owner or distributor representative can be immediately alerted to the situation.

The one or more push buttons 142 or the one or more contact switches 144 of the user interface 185 can be used to detect whether the food asset tracking and monitoring device 810 is affixed to the food container 805 based upon physical contact between the food asset tracking and monitoring device 810 and the food container 805. Alternatively or in addition, the one or more push buttons 142 may be used by a person to prompt the transmission of the marketing or other product-specific data 126 to the smart phone 150, a printer 190, a television display 191, and/or other devices from among the one or more computing devices 180. Alternatively or in addition, the one or more push buttons 142 and the user interface 185 can be used to select a damaged or defective food to initiate a return process (e.g., return merchandise authorization (RMA) and/or credit).

In some embodiments the printer 190 can be configured as part of the system 800 to print food lists 152 or other point of sale materials 154 based upon the detected real-time inventory of food items present at the reseller premises. Alternatively or in addition, documents 156 may be automatically printed using the printer 190 when a food container 805 is moved to designated locations within the reseller premises based upon configurable preferences and settings in the remote logic 182 and/or the local logic 194. The remote logic 182 and the local logic 194 can include any suitable combination of hardware, software, and/or firmware.

Figure 9A:
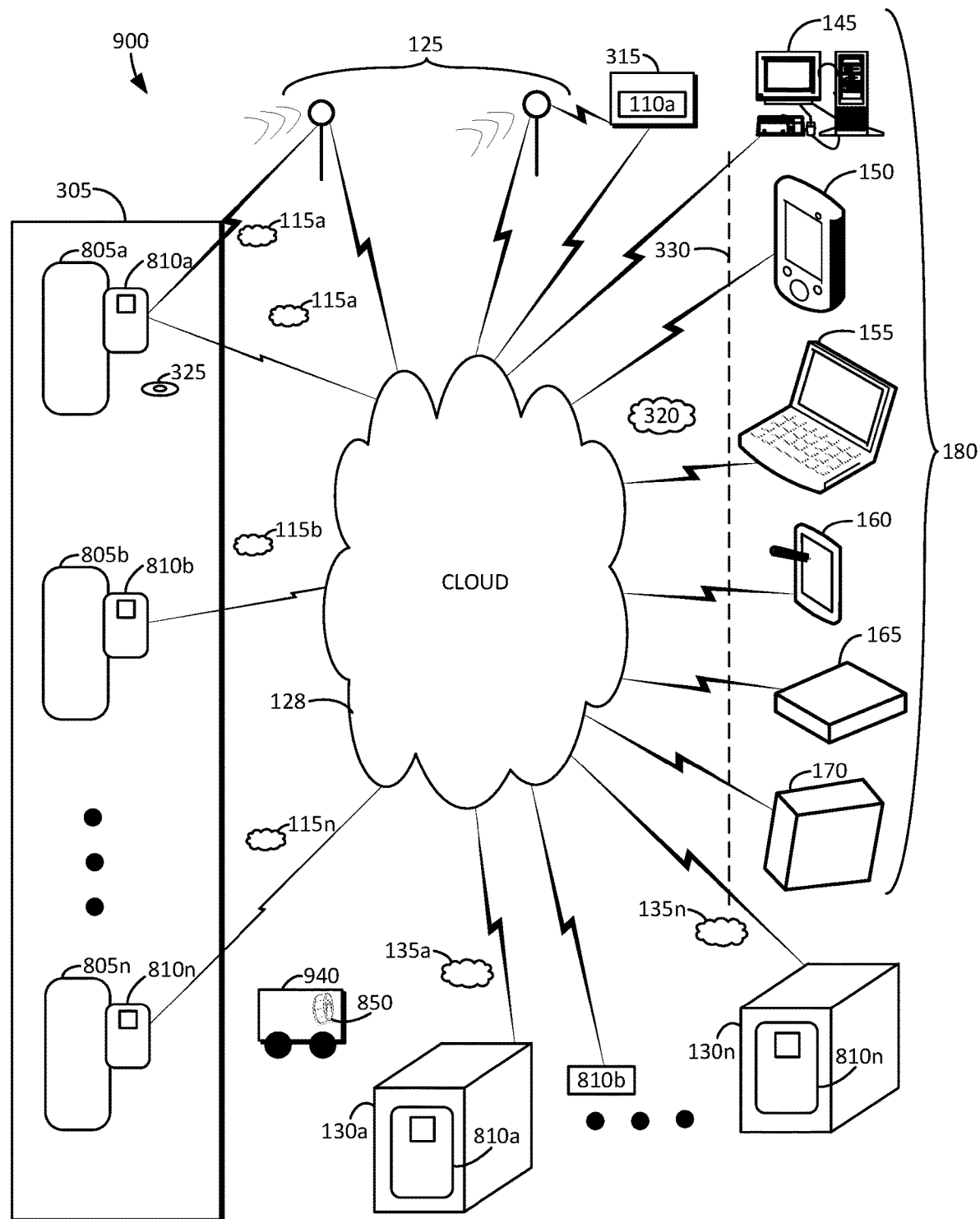
FIG. 9A illustrates a block diagram of another example food management system including multiple food containers and food asset tracking and monitoring devices in accordance with various embodiments of the present inventive concept.

FIG. 9A illustrates a block diagram of another example food management system 900 including multiple food containers (e.g., 805a, 805b, through 805n) and food asset tracking and monitoring devices (e.g., 810a, 810b, through 810n) in accordance with various embodiments of the present inventive concept. Some of the references numerals are the same as those shown in FIG. 8, and therefore, a detailed description of these is not necessarily repeated.

In the system 900, the asset tracking and monitoring devices (e.g., 810a, 810b, through 810n) can each be affixed to a corresponding food container (e.g., 805a, 805b, through 805n) prior to delivery to a reseller destination 305 such as a grocery store. The food containers (e.g., 805a, 805b, through 805n) can be tracked and monitored from source to destination. For example, the food containers (e.g., 805a, 805b, through 805n) can be tracked and monitored from distributor to reseller. Then, once the food containers (e.g., 805a, 805b, through 805n) are at the destination 305, they can be continually monitored until the food within the containers are consumed. Alternatively or in addition, the asset tracking and monitoring devices (e.g., 810a, 810b, through 810n) can be affixed to a shipping container 315. The shipping container 315 can be a carton that contains the food containers, a box that contains the food containers, a case that contains the food containers, or the like.

The telemetry data (e.g., 115a, 115b, through 115n) transmitted by the food asset tracking and monitoring devices (e.g., 810a, 810b, through 810n) and collected by the one or more computing devices 180 may be used to automatically count the inventory of food items as well as determine the number of food items sold to customers of the reseller location 305. For example, the one or more computing devices 180 can receive the telemetry data (e.g., 115a, 115b, through 115n) via the cloud 128 and automatically determine the inventory of food items as well as determine the number of food items sold to customers of the particular reseller location 305. The one or more computing devices 180 can do this for multiple grocery stores each hundreds or thousands of food containers. This enables the efficient management of both taking inventory as well as managing orders from food distributors to replenish sold inventory or order new inventory to meet increased customer demand. The use of the term "real-time inventory management" in this context refers to the automated counting of inventory of food items located at a reseller premises (e.g., 305) with synchronization of this data to one or more computing devices 180. The synchronization can occur continually or at configurable time intervals, and/or in response to events such as excessive temperature, vibration, and light levels.

The management system 900 provides the ability not just to count inventory, but to determine whether the food asset tracking and monitoring devices (e.g., 810a, 810b, through 810n) are removed from the corresponding food container (e.g., 805a, 805b, through 805n), which can indicate that they have been consumed at the reseller premises 305. This provides the ability to obtain sales metrics for food consumed onsite without needing to integrate with or alternatively provide point of sales (POS) functionality or integrate in a payment processing system or related APIs.

The receptacles (e.g., 130a through 130n) can hold corresponding food asset tracking and monitoring devices (e.g., 810a through 810n). The receptacles (e.g., 130a through 130n) can transmit telemetry data (e.g., 135a through 135n) to the one or more computing devices 180 via the cloud 128. The one or more computing devices 180 can automatically determine the inventory of food items for a particular reseller (e.g., destination 305) as well as determine the number of food items sold to customers based on the telemetry data (e.g., 135a through 135n). In some embodiments, the one or more computing devices 180 can automatically make such determinations based on all of the telemetry data (e.g., 115a, 115b, through 115n, and 135a through 135n).

The telemetry data (e.g., 115a, 115b, through 115n, and 135a through 135n) sent by the various devices (e.g., 810a, 810b, through 810n, and 130a through 130n) and used within the system 900 can be transmitted at either fixed intervals or dynamically adjusted intervals based upon either recent motion of a food container (e.g., 805a, 805b, through 805n) or as selected by a person using an application and interface provided on the one or more computing devices 180, via a web site, or other software client or API call. In some embodiments, a real-time clock can also be utilized to adjust transmission intervals based upon time of day. Different modes of operation are supported to maximize battery life, minimize RF channel conflicts and collisions, and/or minimize the latency of counting inventory and other telemetry data from specific devices from among the various devices (e.g., 810a, 810b, through 810n, and 130a through 130n). The ability to balance between these different modes of operations provides support for either a very large number of associated food containers located in close proximity to each other, or alternatively, to increase the rate at which telemetry data is sent when a lesser number of food containers is present, and thus RF bandwidth or chance of collisions is unlikely. Control of transmission settings can be set on the one or more computing devices 180, and configuration settings 320 can be broadcast to one or multiple of the devices (e.g., 810a, 810b, through 810n, and 130a through 130n) located at a reseller location (e.g., destination 305) using a wired or wireless transceiver. In the case of a wireless transceiver, it can be compatible with any suitable RF technology and a protocol.

In some embodiments, the control of transmission settings and configuration settings 320 can be performed on the same device used (e.g., 180) that receives the telemetry data. In alternate embodiments, the control of transmission settings and configuration settings 320 can be performed on a separate device (not shown). In some embodiments, the various control devices (e.g., 180) can optionally incorporate a transceiver capable of broadcasting the configuration settings 320 to one, some, or all of the various devices (e.g., 810a, 810b, through 810n, and 130a through 130n), which may lack this specific functionality.

When a smartphone, tablet, or personal computer is used as a computing device 180 to receive the telemetry data (e.g., 115a, 115b, through 115n) then training, marketing materials, point of sale materials, inventory management, and order management functions can be provided by an installable application installed on the computing device 180. The food asset tracking and monitoring devices (e.g., 810a, 810b, through 810n) described herein are designed to be used multiple times and are not generally intended to be disposed of when an empty food container (e.g., 805a, 805b through 805n) is discarded. As such the food asset tracking and monitoring devices can incorporate replaceable and/or rechargeable batteries 325. The use of inductive charging technologies is beneficial in some embodiments of the inventive system. In other words, the rechargeable batteries 325 can be recharged using an inductive battery charger so that it doesn't need to be removed from the food asset tracking and monitoring device (e.g., 810a) when being charged. The one or more computing devices 180 which may be integrated with the system 900 can provide application programming interfaces (APIs) 330, which facilitate integration with 3rd parties. The APIs 330 can include inventory management and/or demand planning capability used by a supplier, producer, or distributor of food. The APIs 330 can also facilitate integration with electronic menu or online reservation management systems (not shown). In some cases a customer may choose to reserve a food item that a particular grocery store has in inventory or alternatively request a food item that is not in inventory at the grocery store at the time a reservation is made, and/or that can be delivered before the scheduled reservation time and date. Alternatively or in addition, integration with route accounting systems and/or computer aided dispatch (CAD) systems (not shown) allows for the utilization of independent contractors to perform "last mile" delivery from distributor to reseller, e.g., from warehouse locations to grocery stores, and even to the end consumer.

In some embodiments, a wheeled cart 940 includes a food asset tracking and monitoring device (e.g., 850). The wheeled cart 340 can be a smart cart that instructs employees or contractors in the performance of supply chain logistical tasks. In some embodiments, a wheeled cart 940 includes a food asset tracking and monitoring device (e.g., 850). The wheeled cart 940 can be a smart cart that instructs employees or contractors in the performance of supply chain logistical tasks. The smart cart 940 can be moved between zones within a warehouse to facilitate transfers and deliveries of food containers. In some embodiments, all items held in inventory can be contained within one or more smart carts 940. The smart carts 940 can be of various sizes, but in some embodiments can hold between three to six cases and/or cartons of items such as food items. The food asset tracking and monitoring device (e.g., 850) enables real-time tracking, which allows the position of each smart cart 940, and thus the items contained within them to be known at all times. Tasks can be generated to facilitate the movement of the smart carts 940 to particular zones in the warehouse to speed the performance of transfer orders and predicted orders.

For example, when a food distributor or their agent arrives to deliver on an order, the delivery can be directed to a designated receiving area. A computing device such as a tablet 160 or a smart phone 150 can display the order to be received. Selecting the order can prompt the person delivering the items to place those items into one or multiple smart carts 940. The smart carts 940 can be equipped with a food asset tracking and monitoring device (e.g., 850), thereby facilitating the ability to know in real-time the location of the delivery, which can also be easily identified using the LEDs or speaker of the beverage asset tracking and monitoring device 850. The items (e.g., food containers, cases, boxes, cartons, etc.) can be placed into the smart carts 940. A task may be generated at this time to prompt the attachment of a new beverage asset tracking and monitoring device onto each item (e.g., food containers, cases, boxes, cartons, etc.).

Food asset tracking and monitoring devices (e.g., 810) can be associated to individual items (e.g., a single food container) as well as cases containing a known quantity of items (e.g., of a single SKU or homogeneous type). Tasks can be generated to prompt contractors or employees to attach asset tracking and monitoring devices (e.g., 810) to specific cases or individual items, such as a single container of food. Cases of food can continue to be held in the smart carts 940. Individual items can be placed onto racks in specific zones within a warehouse equipped for the purpose of facilitating deliveries. The number of individual items tagged and associated with asset tracking and monitoring devices (e.g., 810) can be determined and/or improved using predictive analytics.

The management system 900 is distinct from systems that incorporate technologies such as RFID (e.g., using active or passive tag), QR codes, bar codes, and the like. Systems utilizing these technologies require the use of components such as antennas, RFID readers, cameras, or bar code scanners. Planning and implementing such a system is both complex and constrained in the locations where deployments can technically function. In particular, RFID readers and antennas have a wireless range of only a few meters. The system 900 and food asset tracking and monitoring devices 810 described herein have sufficient wireless range that the external transceivers 125 can be placed anywhere within a restaurant which is both practical and convenient. In addition, the food containers (e.g., 805a, 805b, through 805n) can be stored in multiple locations within the grocery store 305 with no impairment of functionality. This is not financially or logistically feasible with existent asset tracking technologies such as RFID.

Figure 9B:
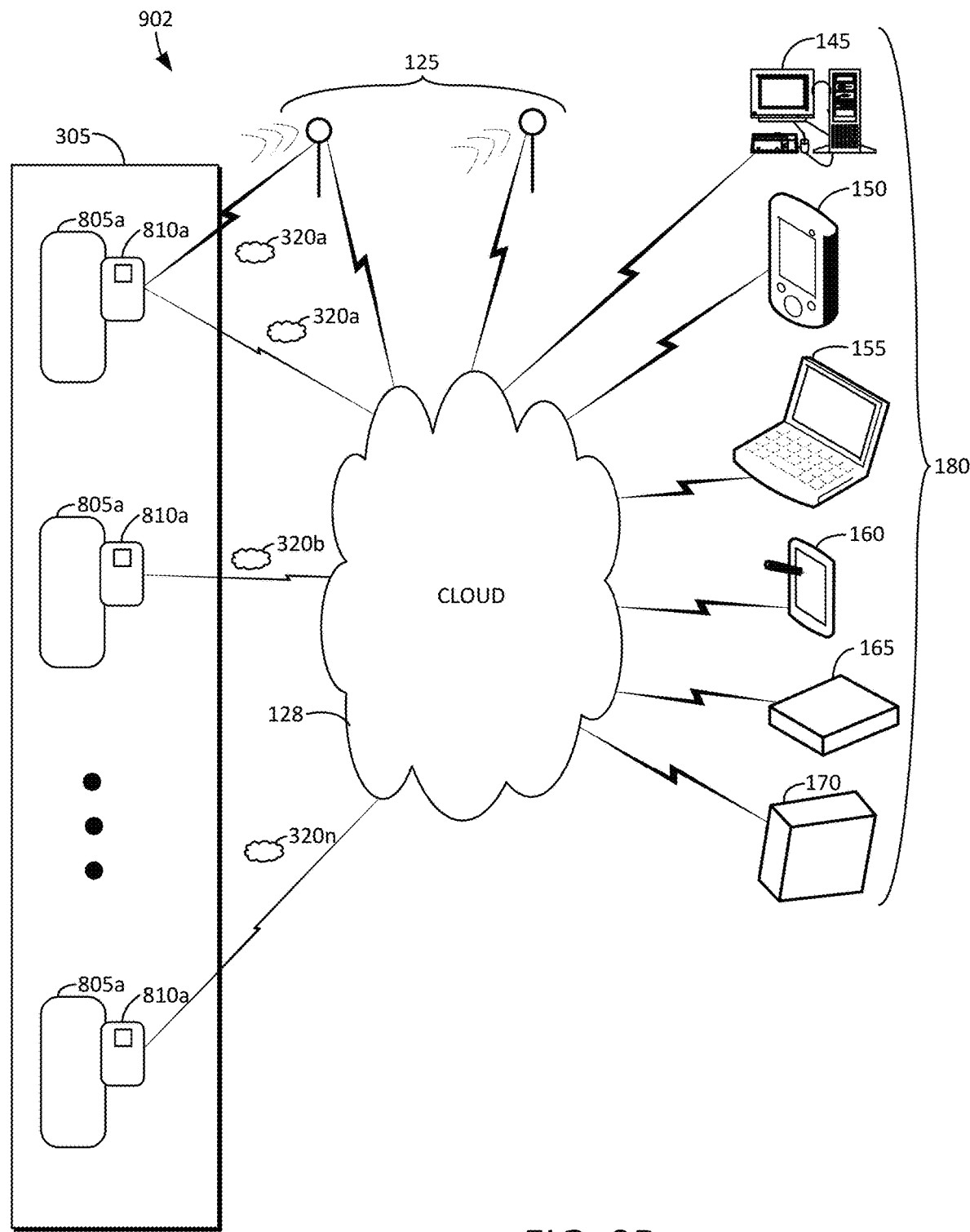
FIG. 9B illustrates a block diagram of yet another example food management system including multiple food containers and food asset tracking and monitoring devices in accordance with various embodiments of the present inventive concept.

FIG. 9B illustrates a block diagram of yet another example food management system 902 including multiple food containers (e.g., 805a, 805b, through 805n) and food asset tracking and monitoring devices (e.g., 810a, 810b, through 810n) in accordance with various embodiments of the present inventive concept. Some of the reference numerals are the same as what is shown and described in FIG. 9A, and for the sake of brevity a detailed description of such is not necessarily repeated.

In some embodiments, the one or more computing devices 180 can identify a specific type of food according to a specific criteria, and transmit one or more instructions (e.g., 320a, 320b, through 320n) to one or more of the food asset tracking and monitoring devices (e.g., 810a, 810b, through 810n) that are affixed to food containers corresponding to the specific type of food. The one or more instructions (e.g., 320a, 320b, through 320n) can cause one or more of the food asset tracking and monitoring devices to turn on the one or more LEDs 134 (of FIG. 1), emit a sound via the speaker 136 (of FIG. 1), buzz a buzzer 138 (of FIG. 1), or the like, via the user interface (e.g., 185 of FIG. 1). Accordingly, a reseller such as a grocery store can quickly and easily locate one or more food items having the specific criteria at a particular location where the food items are stored.

Figure 10:
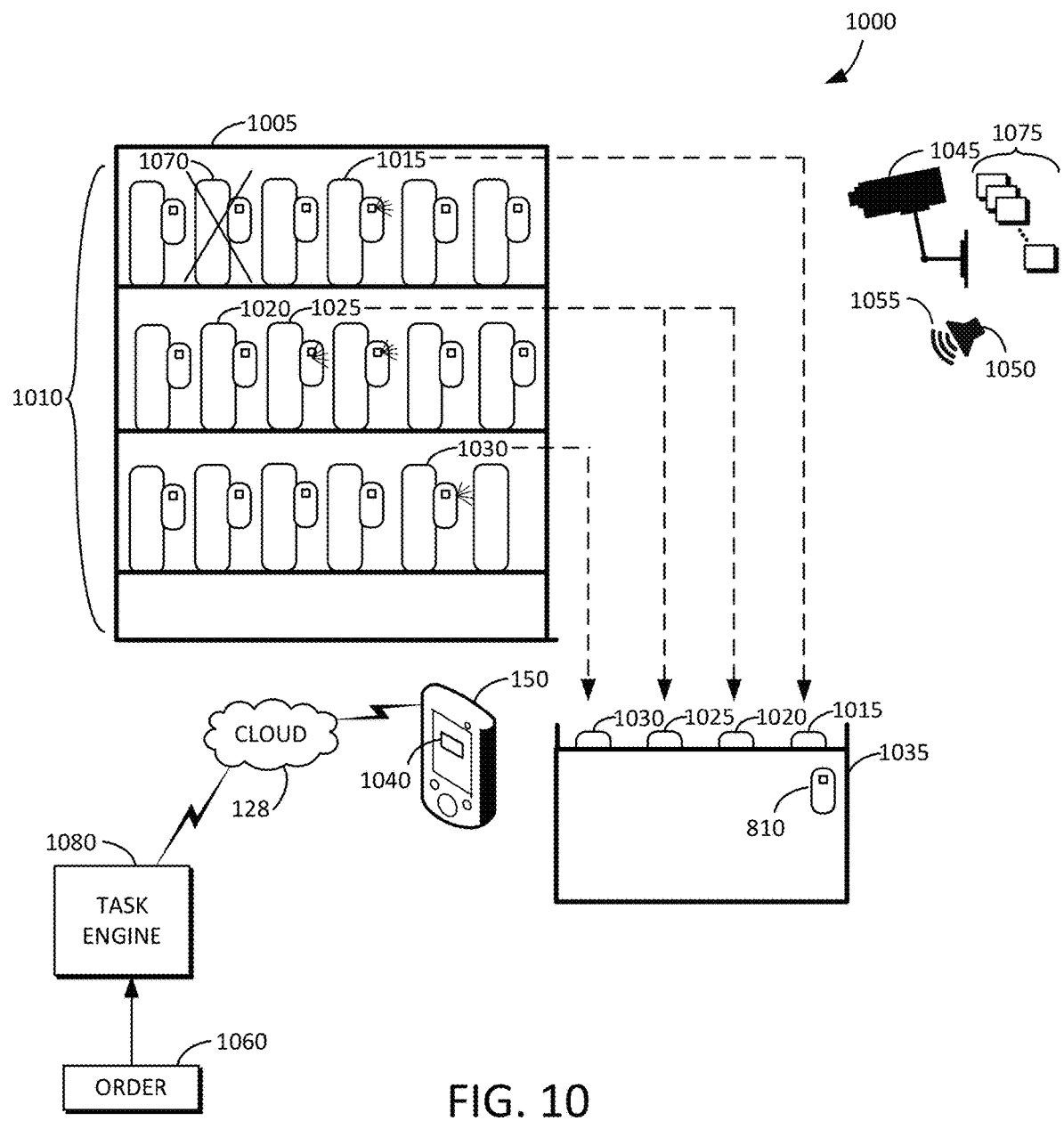
FIG. 10 illustrates a management system for improving supply chain logistical operations and inventory management that facilitates a highly efficient and low-error-rate picking and packing operation of food contained within an order prior to delivery to a reseller, in accordance with various embodiments of the present inventive concept.

FIG. 10 illustrates a management system 1000 for improving supply chain logistical operations and inventory management that facilitates a highly efficient and low-error-rate picking and packing operation of food contained within an order prior to delivery to a reseller, in accordance with various embodiments of the present inventive concept. The management system 1000 can be located within a food wholesaler or distributor location.

The management system 1000 includes a task engine 1080, which can guide contractors or employees of the distributor in the performance of order picking and packing tasks. The task engine 1080 can reside on the computing device 150, or alternatively can reside on a different computing device (e.g., 180) accessible via the cloud 128. For example, the distributor may have a rack or shelf 1005 of food containers 1010 (e.g., 805 of FIG. 8) having food items therein. For each food container (e.g., 1015, 1020, 1025, and 1030) on a particular order 1060, an associated LED 134 of a corresponding food asset tracking and monitoring device 810 lights up. The order 1060 can be a purchase order, a customer order, a transfer order, or the like. Contractors or employees performing a picking task can be instructed by a mobile computing device (e.g., smart phone 150) when they are allowed to remove a subset (e.g., 1015, 1020, 1025, and 1030) of the food containers 1010 with the lit up LED 134 from racks or shelves (e.g., 1005) and place them into one or more shipping containers (e.g., 1035). The one or more shipping containers 1035 can include a carton that contains the food containers, a box that contains the food containers, a case that contains the food containers, or the like. Should a wrong (i.e., having an unlit LED) food container (e.g., 1070) be removed from the rack or shelf 1005, an audible warning 1055 from a speaker 1050 can be automatically emitted and an associated camera 1045 can automatically capture one or more pictures 1075 to provide evidence should there be malicious intent by the person picking and packing the order 560. Alternatively or in addition, the audible warning 1055 may be emitted from the mobile computing device (e.g., smart phone 150) itself. Alternatively or in addition, the audible warning 1055 may be emitted from one or more of the food asset tracking and monitoring devices 810. In some embodiments, the camera 1045 can be continually running so as to capture a complete history of events. Alternatively, the camera 1045 can be activated when the wrong food container (e.g., 1070) is attempted to be removed from the rack or shelf 1005, and then capture a predefined number of the one or more pictures.

When the picking and packing of the order 1060 has been completed, the one or more shipping containers (e.g., 1035) contain the appropriate kind and number of food containers (e.g., 1015, 1020, 1025, and 1030) and associated food items therein for that particular order 1060. In some embodiments, a food asset tracking and monitoring device 810 can be attached to an outer part of the one or more shipping containers (e.g., 1035). The food asset tracking and monitoring device 810 attached to the outer part of the one or more shipping containers (e.g., 1035) can guide the selection of shipping containers for placement onto a pallet, for example, as explained in further detail above.

The task engine 1080 can perform one or more high-level sets of functions. First, the task engine 1080 can generate tasks needed to be performed by contractors or employees. Second, the task engine 1080 can monitor the completion status of tasks. A task in this context can refer to multiple actions that need to be performed. The tasks can be related to logistical operations. For example, a task can include picking items, packing items, moving items from one area of the warehouse to another, associating a food asset tracking and monitoring device 810 to a particular food item, and/or counting of inventory.

Performance of tasks and real-time auditing and oversight of these tasks are facilitated by a combination of integrated hardware and/or software technologies. These can include one or more asset tracking and monitoring devices, which are capable of identifying and tracking their position, or facilitating such in concert with a mobile computing device. The asset tracking and monitoring devices can optionally track temperature, light, motion, orientation, and/or acceleration. The asset tracking and monitoring devices can be associated with individual items, cases of items, pallets of items, smart carts containing a known set of items, as well as points of interest. Cameras can be used to monitor and record the performance of tasks. Object recognition, such as facial recognition, can be used to improve the ability of cameras to perform more effectively. Cameras can be stand-alone or integrated into the mobile computing devices, such as a smart tablet or phone. Mobile computing devices can interact with people to display which tasks need to be performed. A combination of displayed information and speech can be used to do so. Smart door locks and/or electronic locks can be used to control and monitor access to zones within a warehouse via access codes. They may contain a camera and/or microphone.

In some embodiments, the item identification and tracking devices can be used to identify and track non-food items and non-beverage items. For example, office consumables such as printer ink and paper can be identified and tracked using the item identification and tracking devices in a similar fashion as disclosed herein. By way of another example, hardware items sold in a hardware store can be identified and tracked using the item identification and tracking devices in a similar fashion as disclosed herein. By way of yet another example, auto parts sold in an auto parts store can be identified and tracked using the item identification and tracking devices in a similar fashion as disclosed herein. By way of still another example, shoes sold in a shoe store can be identified and tracked using the item identification and tracking devices in a similar fashion as disclosed herein. The use of the item identification and tracking devices can enable same-day delivery of items from a distributor warehouse to a reseller location, or from a reseller location to end users.

Some embodiments include a beverage item identification and tracking device. The beverage item identification and tracking device can include an outer housing and a band attached to the outer housing. The band can be configured to at least partially encircle a neck of a beverage container. The beverage item identification and tracking device can include a wireless communication device and a user interface. The user interface can include one or more LEDs configured to emit light responsive to an instruction received by the wireless communication device so that the beverage container is visually identifiable. The one or more LEDs can emit light in multiple colors. The multiple colors can be configurable. The one or more LEDs can have different blink patterns. In some embodiments, LEDs associated with a first subset of the beverage item identification and tracking devices can have a first LED color or blink pattern, and LEDs associated with a second subset of the beverage item identification and tracking devices can have a second LED color or blink pattern. More than two subsets of the beverage item identification and tracking devices can have different LED colors and/or blink patterns.

In some embodiments, the user interface further includes a display configured to display beverage-related information. In some embodiments, the user interface further includes a speaker configured to emit a sound responsive to the instruction received by the wireless communication device so that the beverage container is audibly identifiable. In some embodiments, the user interface further includes a buzzer configured to buzz responsive to the instruction received by the wireless communication device so that the beverage container is audibly identifiable.

In some embodiments, the beverage item identification and tracking device further includes control logic, and the user interface further includes one or more buttons or switches configured to cause the control logic to perform one or more actions. In some embodiments, the control logic is configured to detect whether or not the outer housing is affixed to the beverage container responsive to an actuation of the one or more buttons or switches.

The beverage item identification and tracking device can further include a local storage device configured to store beverage-related information. In some embodiments, the control logic is configured to at least one of write or read the beverage-related information to or from the local storage device. In some embodiments, the wireless communication device is configured to wirelessly transmit the beverage-related information stored in the local storage device. In some embodiments, the beverage-related information includes telemetry data. In some embodiments, the telemetry data includes at least one of motion data regarding motion of the beverage container, location data regarding a location of the beverage container, proximity data regarding proximity of the beverage container to a known location, temperature data regarding temperature of the beverage container, light intensity data, vibration data, or product-specific data. In some embodiments, the instruction received by the wireless communication device to cause the one or more LEDs to emit light is dependent upon the at least one of the motion data regarding the motion of the beverage container, the location data regarding the location of the beverage container, the proximity data regarding the proximity of the beverage container to the known location, the temperature data regarding the temperature of the beverage container, the light intensity data, the vibration data, or the product-specific data.

In some embodiments, the telemetry data includes all of motion data regarding motion of the beverage container, location data regarding a location of the beverage container, proximity data regarding proximity of the beverage container to a known location, temperature data regarding temperature of the beverage container, light intensity data, vibration data, or product-specific data. In some embodiments, the beverage item identification and tracking device further includes a microprocessor.

Inventive aspects disclosed herein include a system for improving beverage supply chain logistical operations and inventory management. The system can include one or more external wireless communication devices. The system can include a plurality of beverage item identification and tracking devices configured to be attached to a corresponding plurality of beverage containers, wherein each of the plurality of beverage item identification and tracking devices includes an internal wireless communication device. In some embodiments, the one or more external wireless communication devices are configured to communicate with the internal wireless communication device of each of the plurality of beverage item identification and tracking devices.

The system can further include a remote computing device configured to receive beverage-related information from each of the plurality of beverage item identification and tracking devices via the one or more external wireless communication devices. In some embodiments, each of the plurality of beverage item identification and tracking devices includes a light emitting diode (LED) configured to emit light responsive to an instruction received from the remote computing device. In some embodiments, the remote computing device is configured to cause the LED to emit the light for a subset of the plurality of beverage item identification and tracking devices so that a corresponding subset of the plurality of beverage containers is visually identifiable.

In some embodiments, each of the plurality of beverage item identification and tracking devices includes a speaker configured to emit sound responsive to an instruction received from the remote computing device. In some embodiments, the remote computing device is configured to cause the speaker to emit the sound for a subset of the plurality of beverage item identification and tracking devices so that a corresponding subset of the plurality of beverage containers is audibly identifiable. In some embodiments, each of the plurality of beverage item identification and tracking devices includes an outer housing, a band attached to the outer housing, wherein the band is configured to at least partially encircle a neck of a beverage container from among the plurality of beverage containers, and a user interface including one or more light emitting diodes (LEDs) configured to emit light responsive to an instruction received from the remote computing device so that the corresponding beverage container from among the plurality of beverage containers is visually identifiable. In some embodiments, each of the plurality of beverage item identification and tracking devices includes control logic and a local storage device configured to store the beverage-related information. In some embodiments, the control logic is configured to at least one of write or read the beverage-related information to or from the local storage device. In some embodiments, the internal wireless communication device is configured to wirelessly transmit the beverage-related information stored in the local storage device to the remote computing device via the one or more external wireless communication devices. In some embodiments, the beverage-related information includes telemetry data.

Some embodiments include a food item identification and tracking device. The food item identification and tracking device can include a wireless communication device and a user interface. The user interface can include one or more LEDs configured to emit light responsive to an instruction received by the wireless communication device so that the food container is visually identifiable. The one or more LEDs can emit light in multiple colors. The multiple colors can be configurable. The one or more LEDs can have different blink patterns. In some embodiments, LEDs associated with a first subset of the food item identification and tracking devices can have a first LED color or blink pattern, and LEDs associated with a second subset of the food item identification and tracking devices can have a second LED color or blink pattern. More than two subsets of the food item identification and tracking devices can have different LED colors and/or blink patterns.

In some embodiments, the user interface further includes a display configured to display food-related information. In some embodiments, the user interface further includes a speaker configured to emit a sound responsive to the instruction received by the wireless communication device so that the food container is audibly identifiable. In some embodiments, the user interface further includes a buzzer configured to buzz responsive to the instruction received by the wireless communication device so that the food container is audibly identifiable.

In some embodiments, the food item identification and tracking device further includes control logic, and the user interface further includes one or more buttons or switches configured to cause the control logic to perform one or more actions. In some embodiments, the control logic is configured to detect whether or not the outer housing is affixed to the food container responsive to an actuation of the one or more buttons or switches.

The food item identification and tracking device can further include a local storage device configured to store food-related information. In some embodiments, the control logic is configured to at least one of write or read the food-related information to or from the local storage device. In some embodiments, the wireless communication device is configured to wirelessly transmit the food-related information stored in the local storage device. In some embodiments, the food-related information includes telemetry data. In some embodiments, the telemetry data includes at least one of motion data regarding motion of the food container, location data regarding a location of the food container, proximity data regarding proximity of the food container to a known location, temperature data regarding temperature of the food container, light intensity data, vibration data, or product-specific data. In some embodiments, the instruction received by the wireless communication device to cause the one or more LEDs to emit light is dependent upon the at least one of the motion data regarding the motion of the food container, the location data regarding the location of the food container, the proximity data regarding the proximity of the food container to the known location, the temperature data regarding the temperature of the food container, the light intensity data, the vibration data, or the product-specific data.

In some embodiments, the telemetry data includes all of motion data regarding motion of the food container, location data regarding a location of the food container, proximity data regarding proximity of the food container to a known location, temperature data regarding temperature of the food container, light intensity data, vibration data, or product-specific data. In some embodiments, the food item identification and tracking device further includes a microprocessor.

Inventive aspects disclosed herein include a system for improving food supply chain logistical operations and inventory management. The system can include one or more external wireless communication devices. The system can include a plurality of food item identification and tracking devices configured to be attached to a corresponding plurality of food containers, wherein each of the plurality of food item identification and tracking devices includes an internal wireless communication device. In some embodiments, the one or more external wireless communication devices are configured to communicate with the internal wireless communication device of each of the plurality of food item identification and tracking devices.

The system can further include a remote computing device configured to receive food-related information from each of the plurality of food item identification and tracking devices via the one or more external wireless communication devices. In some embodiments, each of the plurality of food item identification and tracking devices includes a light emitting diode (LED) configured to emit light responsive to an instruction received from the remote computing device. In some embodiments, the remote computing device is configured to cause the LED to emit the light for a subset of the plurality of food item identification and tracking devices so that a corresponding subset of the plurality of food containers is visually identifiable.

In some embodiments, each of the plurality of food item identification and tracking devices includes a speaker configured to emit sound responsive to an instruction received from the remote computing device. In some embodiments, the remote computing device is configured to cause the speaker to emit the sound for a subset of the plurality of food item identification and tracking devices so that a corresponding subset of the plurality of food containers is audibly identifiable. In some embodiments, each of the plurality of food item identification and tracking devices includes an outer housing, a band attached to the outer housing, wherein the band is configured to at least partially encircle a neck of a food container from among the plurality of food containers, and a user interface including one or more light emitting diodes (LEDs) configured to emit light responsive to an instruction received from the remote computing device so that the corresponding food container from among the plurality of food containers is visually identifiable. In some embodiments, each of the plurality of food item identification and tracking devices includes control logic and a local storage device configured to store the food-related information. In some embodiments, the control logic is configured to at least one of write or read the food-related information to or from the local storage device. In some embodiments, the internal wireless communication device is configured to wirelessly transmit the food-related information stored in the local storage device to the remote computing device via the one or more external wireless communication devices. In some embodiments, the food-related information includes telemetry data.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts.

Further, the blocks, units and/or modules of the embodiments may be physically combined into more complex blocks, units and/or modules without departing from the scope of the inventive concepts.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A system for improving supply chain logistical operations and inventory management, the system comprising:
   one or more external wireless communication devices;
   a plurality of beverage item identification and tracking devices configured to be attached to a corresponding plurality of beverage containers, wherein each of the plurality of beverage item identification and tracking devices includes an internal wireless communication device and a display configured to display beverage-related information;
   a remote computing device configured to receive the beverage-related information from each of the plurality of beverage item identification and tracking devices via the one or more external wireless communication devices; and
   a smart wheeled cart including an identification and tracking device attached thereto, and configured to hold the plurality of beverage containers and a plurality of food containers, wherein the identification and tracking device is configured to track in real-time a position of the smart wheeled cart holding the plurality of beverage containers and the plurality of food containers,
   wherein the identification and tracking device attached to the smart wheeled cart does not depend on any radio frequency ID (RFID) reader attached to the smart wheeled cart, and
   wherein the one or more external wireless communication devices are configured to communicate with the internal wireless communication device of each of the plurality of beverage item identification and tracking devices.

2. The system for improving supply chain logistical operations and inventory management of claim 1, further comprising:
   a plurality of food item identification and tracking devices configured to be attached to the corresponding plurality of food containers, wherein each of the plurality of food item identification and tracking devices includes an internal wireless communication device and a display configured to display food-related information,
   wherein:
   each of the plurality of beverage item identification and tracking devices includes a light emitting diode (LED) configured to emit light responsive to an instruction received from the remote computing device;
   the remote computing device is configured to cause the LED to emit the light for a subset of the plurality of beverage item identification and tracking devices so that a corresponding subset of the plurality of beverage containers is visually identifiable;
the one or more external wireless communication devices are configured to communicate with the internal wireless communication device of each of the plurality of food item identification and tracking devices;
each of the plurality of food item identification and tracking devices includes a light emitting diode (LED) configured to emit light responsive to the instruction received from the remote computing device;
the remote computing device is configured to cause the LED to emit the light for a subset of the plurality of food item identification and tracking devices so that a corresponding subset of the plurality of food containers is visually identifiable; and
the remote computing device includes a task engine that is configured to:
receive one or more items associated with a purchase order;
generate a task associated with the purchase order;
associate the instruction with the task;
send the instruction to the plurality of beverage item identification and tracking devices to cause the LEDs to emit the light for the subset of the plurality of beverage item identification and tracking devices and the subset of the plurality of food item identification and tracking devices corresponding to the one or more items associated with the purchase order in accordance with the task; and
monitor a completion status of the task.

3. The system for improving supply chain logistical operations and inventory management of claim 1, wherein:
each of the plurality of beverage item identification and tracking devices includes a speaker configured to emit sound responsive to an instruction received from the remote computing device;
the remote computing device is configured to cause the speaker to emit the sound for a subset of the plurality of beverage item identification and tracking devices so that a corresponding subset of the plurality of beverage containers is audibly identifiable; and
the remote computing device includes a task engine that is configured to:
receive one or more items associated with a purchase order;
generate a task associated with the purchase order;
cause the speaker to emit the sound for the subset of the plurality of beverage item identification and tracking devices corresponding to the one or more items associated with the purchase order in accordance with the task; and
monitor a completion status of the task.

4. The system for improving supply chain logistical operations and inventory management of claim 1, wherein each of the plurality of beverage item identification and tracking devices includes:
an outer housing;
a band attached to the outer housing, wherein the band is configured to at least partially encircle a neck of a beverage container from among the plurality of beverage containers; and
a user interface including one or more light emitting diodes (LEDs) configured to emit light responsive to an instruction received from the remote computing device so that the corresponding beverage container from among the plurality of beverage containers is visually identifiable, wherein:
the outer housing includes a planar surface; and
the band is configured to hold the planar surface of the outer housing to a single side of a tangential plane of a curve of the neck of the beverage container.

5. The system for improving supply chain logistical operations and inventory management of claim 1, further comprising:
a camera configured to capture one or more pictures;
at least one of a rack or shelf configured to hold the plurality of beverage containers;
wherein each of the plurality of beverage item identification and tracking devices includes:
a light emitting diode (LED) configured to emit light responsive to an instruction received from the remote computing device;
control logic; and
a local storage device configured to store the beverage-related information,
wherein the control logic is configured to at least one of write or read the beverage-related information to or from the local storage device,
wherein the internal wireless communication device is configured to wirelessly transmit the beverage-related information stored in the local storage device to the remote computing device via the one or more external wireless communication devices, and
the camera is configured to capture the one or more pictures responsive to a beverage container having a beverage item identification and tracking device with an unlit LED being removed from the at least one of the rack or shelf.

6. The system for improving supply chain logistical operations and inventory management of claim 5, wherein the beverage-related information includes telemetry data having motion data regarding motion of the beverage container, location data regarding a location of the beverage container, proximity data regarding proximity of the beverage container to a known location, temperature data regarding temperature of the beverage container, light intensity data, vibration data, and product-specific data.

7. The system for improving supply chain logistical operations and inventory management of claim 4, wherein:
the beverage-related information includes telemetry data;
the telemetry data includes at least one of tilt angle of the beverage container, light intensity data, or vibration data; and
the instruction received from the remote computing device to cause the one or more LEDs to emit the light is dependent upon the at least one of the tilt angle of the beverage container, the light intensity data, or the vibration data.

8. The system for improving supply chain logistical operations and inventory management of claim 1, further comprising:
a plurality of food item identification and tracking devices configured to be attached to the corresponding plurality of food containers, wherein each of the plurality of food item identification and tracking devices includes an internal wireless communication device and a display configured to display food-related information,
wherein the one or more external wireless communication devices are configured to communicate with the internal wireless communication device of each of the plurality of food item identification and tracking devices.

9. The system for improving supply chain logistical operations and inventory management of claim 8, wherein the plurality of food containers includes a container having a known quantity of food.

10. The system for improving supply chain logistical operations and inventory management of claim 1, wherein each of the plurality of beverage item identification and tracking devices includes at least one of a button or switch to detect whether the plurality of beverage item identification and tracking devices is affixed to the corresponding plurality of beverage containers based upon physical contact between the plurality of beverage item identification and tracking devices and the corresponding plurality of beverage containers.

11. The system for improving supply chain logistical operations and inventory management of claim 1, wherein the remote computing device is configured to send to a distributor an inventory of the plurality of beverage containers and the plurality of food containers.

12. The system for improving supply chain logistical operations and inventory management of claim 1, wherein the beverage-related information includes telemetry data, the system further comprising a camera configured to capture one or more pictures of the plurality of beverage item identification and tracking devices and the corresponding plurality of beverage containers based on the beverage-related information including the telemetry data received by the remote computing device.

13. The system for improving supply chain logistical operations and inventory management of claim 12, wherein the camera is configured to perform at least one of object recognition or facial recognition.

14. The system for improving supply chain logistical operations and inventory management of claim 12, further comprising a printer configured to print one or more documents based on the beverage-related information including the telemetry data received by the remote computing device.

15. The system for improving supply chain logistical operations and inventory management of claim 1, further comprising:
   a remote computing device configured to receive the beverage-related information from each of the plurality of beverage item identification and tracking devices via the one or more external wireless communication devices, wherein the remote computing device is configured to provide at least one of i) training, ii) marketing materials, iii) point of sale materials, iv) inventory management, or v) order management by an application of the remote computing device.

16. The system for improving supply chain logistical operations and inventory management of claim 2, wherein:
   each of the plurality of beverage item identification and tracking devices is configured to detect whether it has been removed from a corresponding one of the plurality of beverage containers, and to transmit first telemetry data including an indication of the removal;
   the remote computing device is configured to manage beverage inventory for at least one of a restaurant or grocery store based on the first telemetry data;
   the remote computing device is configured to transmit one or more orders to a beverage distributor to replenish the beverage inventory; and
   each of the plurality of food item identification and tracking devices is configured to detect whether it has been removed from a corresponding one of the plurality of food containers, and to transmit second telemetry data including an indication of the removal.

17. A system for improving supply chain logistical operations and inventory management, the system comprising:
   one or more external wireless communication devices;
   a plurality of beverage item identification and tracking devices configured to be attached to a corresponding plurality of beverage containers, wherein each of the plurality of beverage item identification and tracking devices includes an internal wireless communication device and a display configured to display beverage-related information;
   a remote computing device configured to receive the beverage-related information including telemetry data from each of the plurality of beverage item identification and tracking devices via the one or more external wireless communication devices, wherein each of the plurality of beverage item identification and tracking devices includes at least one of a light emitting diode (LED) configured to emit light responsive to an instruction received from the remote computing device or a speaker configured to emit sound responsive to the instruction received from the remote computing device;
   a task engine operable within the remote computing device, wherein the task engine is configured to:
   receive one or more items associated with a purchase order;
   generate a task associated with the purchase order;
   associate the instruction with the task;
   send the instruction to the plurality of beverage item identification and tracking devices to cause at least one of i) the LEDs of the plurality of beverage item identification and tracking devices to emit the light or ii) the speaker of the plurality of beverage item identification and tracking devices to emit the sound corresponding to the one or more items associated with the purchase order in accordance with the task; and
   monitor a completion status of the task,
   wherein the one or more external wireless communication devices are configured to communicate with the internal wireless communication device of each of the plurality of beverage item identification and tracking devices.

18. The system for improving supply chain logistical operations and inventory management of claim 17, wherein the task is a first task, and the instruction is a first instruction, the system further comprising:
   a smart wheeled cart including an identification and tracking device attached thereto, and configured to hold the plurality of beverage containers and a plurality of food containers, wherein the identification and tracking device is configured to track in real-time a position of the smart wheeled cart holding the plurality of beverage containers and the plurality of food containers, wherein:
   the identification and tracking device attached to the smart wheeled cart does not depend on any radio frequency ID (RFID) reader attached to the smart wheeled cart; and
   the task engine is configured to:
   generate a second task associated with the smart wheeled cart;
   send a second instruction associated with the second task to the identification and tracking device attached to the smart wheeled cart to facilitate movement of the smart wheeled cart within a plurality of zones in a warehouse; and
   monitor a completion status of the second task.

19. A system for improving supply chain logistical operations and inventory management, the system comprising:
one or more external wireless communication devices;
a plurality of beverage item identification and tracking devices configured to be attached to a corresponding plurality of beverage containers, wherein each of the plurality of beverage item identification and tracking devices includes an internal wireless communication device and a display configured to display beverage-related information; and
a remote computing device configured to communicate with each of the plurality of beverage item identification and tracking devices via the one or more external wireless communication devices, wherein the remote computing device is configured to:
broadcast transmission settings to each of the plurality of beverage item identification and tracking devices via the one or more external wireless communication devices, wherein:
the transmission settings include a plurality of modes of operation;
the plurality of modes of operation include a first mode of operation in which telemetry data associated with the plurality of beverage item identification and tracking devices is transmitted at fixed intervals;
the plurality of modes of operation include a second mode of operation in which the telemetry data associated with the plurality of beverage item identification and tracking devices is transmitted at dynamically adjusted intervals;
the plurality of modes of operation include a third mode of operation in which the telemetry data associated with the plurality of beverage item identification and tracking devices is transmitted based on time of day; and
the one or more external wireless communication devices are configured to communicate with the internal wireless communication device of each of the plurality of beverage item identification and tracking devices.

* * * * *